Sept. 29, 1964 J. P. LAMB 3,151,298

CIRCUIT FOR GENERATING PULSES HAVING STEEP WAVE FRONTS

Original Filed Dec. 31, 1956 6 Sheets-Sheet 1

INVENTOR.
JEFFERSON P. LAMB
BY [signature]
AGENT.

Sept. 29, 1964 J. P. LAMB 3,151,298

CIRCUIT FOR GENERATING PULSES HAVING STEEP WAVE FRONTS

Original Filed Dec. 31, 1956 6 Sheets-Sheet 2

INVENTOR.
JEFFERSON P. LAMB

BY [signature]

AGENT.

Sept. 29, 1964 J. P. LAMB 3,151,298

CIRCUIT FOR GENERATING PULSES HAVING STEEP WAVE FRONTS

Original Filed Dec. 31, 1956

6 Sheets-Sheet 3

INVENTOR.
JEFFERSON P. LAMB
BY [signature]
AGENT.

INVENTOR.
JEFFERSON P. LAMB
BY
AGENT.

INVENTOR.
JEFFERSON P. LAMB
BY [signature]
AGENT.

CIRCUIT FOR GENERATING PULSES HAVING STEEP WAVE FRONTS

Original Filed Dec. 31, 1956 6 Sheets-Sheet 6

INVENTOR.
JEFFERSON P. LAMB
BY [signature]
AGENT.

3,151,298

CIRCUIT FOR GENERATING PULSES HAVING STEEP WAVE FRONTS

Jefferson P. Lamb, Tulsa, Okla., assignor to Dresser Industries, Inc., Dallas, Tex., a corporation of Delaware Original application Dec. 31, 1956, Ser. No. 631,789. Divided and this application Nov. 17, 1958, Ser. No. 774,805

4 Claims. (Cl. 328—28)

The invention hereinafter disclosed relates to means and methods of securing information relating to physical characteristics of earth formations penetrated by a borehole such as a well; and more particularly the invention relates to an inventigative system of that class commonly termed electrical borehole logging systems.

This application is a division of an application of Jefferson P. Lamb, Serial No. 631,789 filed December 31, 1956, entitled "Electrical Logging Systems for Earth Baseholes," now abandoned.

As ordinarily constituted, an electrical logging system for earth boreholes comprises means for supplying electric current to one or more electrodes so situated in the borehole that the current follows paths through the borehole encircling earth to a return electrode, one or more potential or "pick-up" electrodes subjected to electric field potentials created in the vicinity of the borehole by the electric current, and means for recording representations of the field potentials. Ordinarily the current-emanating electrode system and the pick-up electrodes are disposed on a tool or means traversable along the borehole by an electric conductor cable which is payed out into and withdrawn from the borehole by winch apparatus. To avoid polarizing effects at the electrode surfaces, the current supplied for passage through the earth is alternating in character.

To provide a more complete series of data in the record produced as the electrode system is traversed along the borehole, it is desirable to secure and record substantially continuous measures of the potentials created between electrodes arranged with different spacings and different locations relative to the current electrode system. For example, it is desirable to secure records of the potentials exhibited between the two (pick-up) electrodes under each of different pick-up electrodes pair spacings, with current "injected" into the borehole-encircling formation at appropriate current electrode locations spaced from the pick-up electrodes, to provide, for example, what are in the art commonly termed short normal, long normal, short lateral, and long lateral electrical "logs" or curves. In addition it is desirable to secure and record indications of the variations in a D.C. potential existing between spaced-apart electrodes in the borehole, and variously known as the "spontaneous potential" or "natural potential." These are, of course, only exemplary of the types of information which it may be desirable to log.

Various means and modes of supplying current to a current-emanating electrode system, and for measuring and recording the natural potential (hereinafter denoted N.P.) and the pick-up electrode potentials, have been employed. In one known electrical logging system, current supplied from generating means outside the borehole is conducted to the traversing electrode-supporting tool in the borehole by way of a single-conductor insulated electrical cable, the current returning to the generator by way of an earth path and a surface ground electrode or by way of a conductive armor sheath comprised in the cable. In that system, the potentials are measured by apparatus contained in the borehole traversing tool, and the mensuration data communicated to the recording location outside the borehole by frequency modulation telemetering, using several high-frequency carrier waves. In another known system of electrical logging, use is made of a multi-conductor insulated electric cable comprising six or more individual conductors each of which is devoted to continuous transmission of a single current (or voltage). The current for passage through the earth formations is conducted from an alternating current generator to the current electrode system in the borehole through one of the insulated conductors of the cable; and the potentials between the potential electrodes are conducted over others of the cable conductors to a location outside the borehole for measurement and registration by recording means.

In all of the aforementioned electric borehole-logging systems, considerable difficulty is experienced in attempting to secure accurate representation of the mensuration data whose origin is at various stations along the borehole. The principal difficulty is presented by the fact that the intelligence transmission medium, namely the cable conductor or conductors, has varying and unpredictable transmission characteristics as it is payed out from or reeled in by the winch and as a varying portion of the total length of cable is traversed through the borehole where temperatures, pressures and other factors affecting the electrical characteristics of the cable are far from constant. As is well known, resistance of any economically feasible cable conductor varies with variations in temperature, so the resistances of the individual cable conductors are continually varying in a non-linear manner as the logging tool and cable move through zones of different temperatures during traverse along a borehole. It is also well known that inter-conductor capacitance varies as the cable conductors are reeled and unreeled and pass through or along different sections of the borehole, and that inter-conductor leakage resistance varies with age and operating conditions. Another difficulty encountered in the attempt to secure accurate representations outside the borehole of the currents and/or potentials existing at the electrode locations in the borehole, is presented by the so-called "cross-talk" which is manifest when alternating or varying currents flow in conductors which are in close proximity to each other. The conductors of the cable, situated in close side-by-side relationship inside the cable sheath or armor, are markedly subject to such cross-talk effects, any varying current in one of the conductors inevitably causing an undesired concurrent potential or current to be manifest in each of the other conductors.

As may be deduced from the preceding brief sketch of adverse environmental and constructional factors faced in electrical logging system design and practice, the systems heretofore employed were deficient or objectionable in one or more respects in the matter of providing accurate graphical representations or logs of a plurality of physical characteristics of borehole-encircling earth. The frequency modulated carrier wave telemetering system requires a large amount of electronic equipment in the logging tool and hence suffers from all the deficiencies and troubles resulting from operating that type of equipment in a high-temperature environment where circuit elements tend to fail to maintain constant electrical characteristic values. Additionally, signal distortion and depreciation due to necessary channel filter circuitry are undesirable features of that system; not to mention the voluminous nature or amount of apparatus necessary in the logging tool traversed along the borehole. That logging system wherein a large many-conductor cable is employed suffers from the drawback of excessive distortion or lack of precision in logs secured, because of the complex and very variable degree of cross-talk and leakage between conductors; and also any cable of more than three insulated conductors and sheath is initially a very expensive device of short useful life, and a component requiring an excessive amount of maintenance.

It has been demonstrated that of all plural-conductor armored cables, that type consisting essentially of three insulated electrical conductors and a conductive armor sheath of a plurality of spirally applied outer wires, provides the most durable and trouble-free construction. Such a cable provides, in its sheath, and armor and an effective return or "ground" conductor; and an individual conductor for transmission of very low frequency N.P. variations and relatively high frequency alternating current power, and two conductors which may be employed for control and information signaling and other subsidiary functions. The term "three-conductor cable" as hereinafter employed is used to define or designate a cable of the construction just described and consisting essentially of three individually insulated electrical conductor units (either stranded or single wire, for example), insulation and an outer electrically conductive sheath or armor.

With the aforementioned deficiencies of prior electrical borehole-logging systems in view, it is a prime object of the present invention to provide an improved electrical borehole-logging system. Another object is to provide an electrical borehole-logging system free of the deficiencies of frequency-modulation telemetering of logging data and free of the deficiencies and objectionable features of logging systems employing many-conductor cable means in the borehole. Another prime object of the invention is to provide a constant-current electrical borehole-logging system. Another object is to provide an electrical borehole-logging system utilizing a three-conductor cable and capable of providing at least five accurate logs for each traverse along a borehole. Another object is to provide a logging system utilizing a three-conductor cable and capable, during each borehole traverse, of providing short and long normal electrical logs, short and long lateral electrical logs, and an N.P. log.

Another object of the invention is to provide an effective electrical logging system for producing a plurality of logs at each logging traverse with a minimum number of subsurface electron tube devices.

Another object of the invention is to provide means whereby electric power for simultaneously operating subsurface apparatus and emanating constant current from the subsurface current-emanating electrodes is transmitted through a single conductor and sheath of a plural-conductor cable.

Another object of the invention is to provide an electrical logging system with means for calibrating subsurface apparatus during a logging traverse of an earth borehole.

Another object of the invention is to provide an improved means and method for signaling logging information or data from within an earth borehole during a logging traverse.

Another object of the invention is to provide an improved means and mode for producing an electric control pulse having an extremely sharp wave front, from a grossly distorted direct current pulse of much greater duration.

Another object of the invention is to provide an improved means and mode for providing alternating current of constant intensity for transmission to the current-electrode system and other apparatus of a logging tool.

Another object of the invention is to provide a logging system in which the adverse effects of inter-conductor leakage of alternating current are nullified or rendered of no consequence.

Another object is to provide a novel means and mode for regulating a constant current A.C. generator whereby phase-shift in the output current does not produce a change in intensity of the generator output.

Another object is to provide a novel logging system constant-current A.C. generator with instantaneous regulation of output.

Another object is to provide a logging system having means whereby the positions of switch means in a logging tool may be changed by remotely controlled means in surface apparatus, and the positional status of the switch means there ascertained and indicated.

Another object of the invention is to provide a novel alternating current generator having substantially instantaneous regulation of its output.

Another object is to provide an improved pulse-formation circuit.

An additional feature and object of the invention is the provision of means whereby calibration of subsurface instrumentalities in the logging tool may be effected quickly and during a borehole traverse, whereby the operator may quickly determine the operation-characteristics of the subsurface apparatus.

The aforementioned and other objects and advantages hereinafter made apparent are accomplished by the invention, a preferred exemplary embodiment of apparatus conforming to the principles thereof being diagrammatically depicted in the accompanying drawings, in which:

FIG. 1 is a schematic diagram depicting the earth borehole environment in which the invention is practiced, with principal surface and subsurface apparatus components indicated and illustrated principally in the form of a functional block diagram;

FIGS. 2*a* and 2*b* comprise a schematic circuit diagram of that portion of the "surface apparatus," at the operating location outside the borehole, which is included in the block diagram enclosed by the dot-dash line in the upper part of FIG. 1;

FIGS. 3*a* and 3*b* comprise a schematic circuit diagram of the principal components of the "subsurface apparatus" which is principally enclosed in the logging tool adapted to be traversed along an earth borehole;

FIGS. 4 and 4*a* are graphical representations on Cartesian coordinates of current-voltage characteristics of certain components of the constant current supply unit of the exemplary apparatus;

FIG. 5 is a series of graphical representations of resistivity-representing signals;

FIGS. 6 and 6*a* are graphical representations of potentials occurring at certain locations in the surface apparatus;

Figure 1:
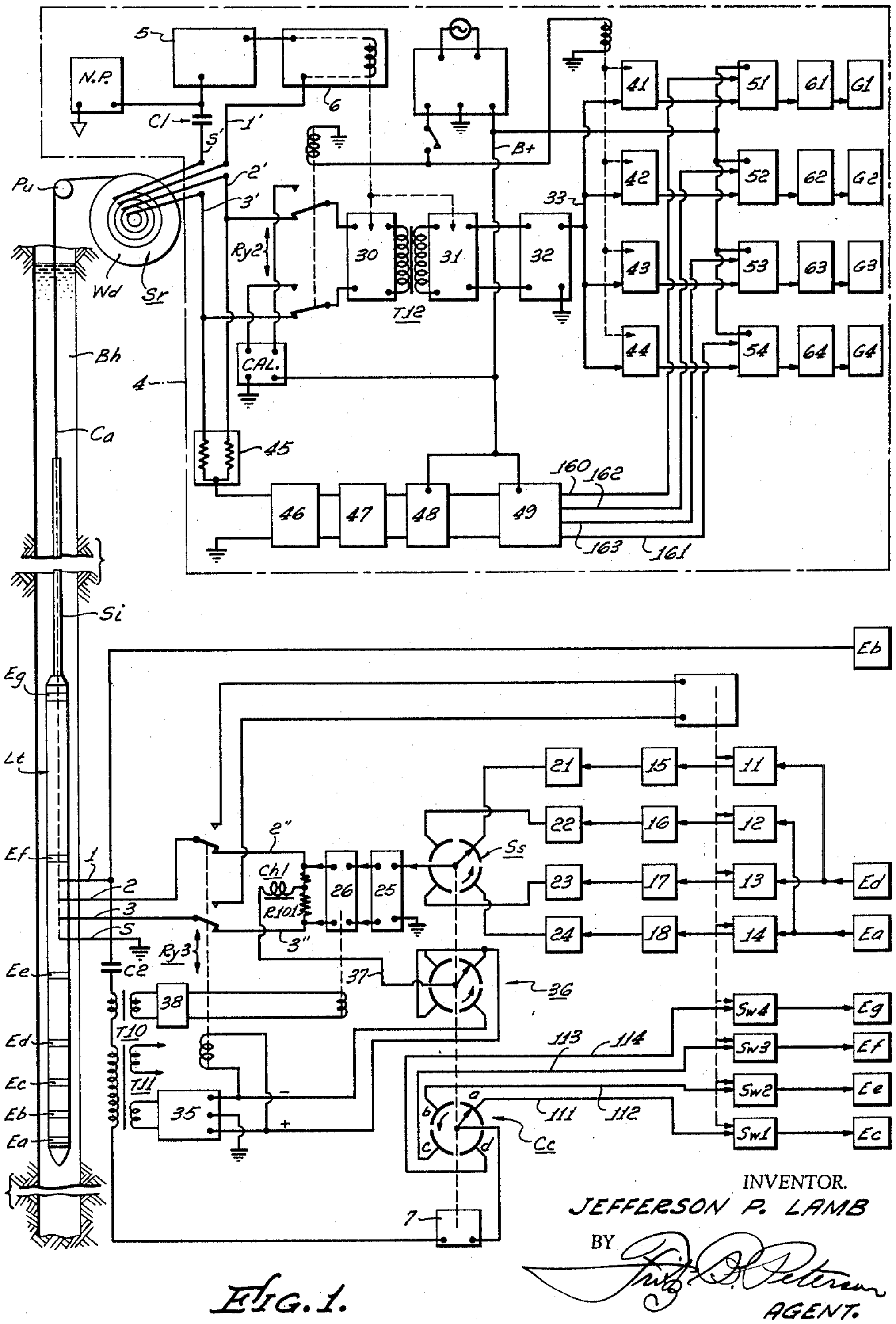

FIGS. 2*a*, 2*b*, 3*a* and 3*b* in composite illustrate in schematic form the subsurface apparatus situated at the operating location outside an earth borehole, the subsurface apparatus which in operation is traversed along an extent of borehole, and the cable means by which the subsurface apparatus or "tool" is supported and traversed along the borehole and which concurrently conveys power from the surface apparatus to the subsurface and serves as a signal transmission medium interconnecting the surface and subsurface apparatuses. Due to the considerations and environmental and operational factors hereinbefore briefly mentioned, the cable is restricted to three insulated conductors and a conductive sheath or armor. Except in respect of certain details hereinafter made fully evident, the actual physical assembly and mounting of the electrical and electronic components of the surface and subsurface apparatuses may vary widely in design, it being obvious that the subsurface apparatus must be suitably housed in an elongated vessel or container adapted to withstand the very high external pressures and high temperatures encountered in deep liquid-filled boreholes. Further, as is evident to those skilled in the art, the mentioned vessel must be of suitably small transverse dimensions to permit of operation in earth boreholes, and must be fluid-tight.

Since the exemplary logging system of the invention requires emanation of current of constant intensity from the current electrodes of the subsurface apparatus or tool, and since this current is alternating in character and is supplied through the variable resistance of the cable, an alternating current generator capable of supplying constant current under variable load conditions is necessary. The current is commutated in the logging tool and fed to different sets of current electrodes, each set in its turn. Utilization of a current of constant intensity permits measurement of only voltage rather than both current and voltage, thereby considerably reducing the amount of apparatus needed, and presents the additional marked advantage of eliminating the effects of varying resistance of the current circuit during borehole traverse. The accuracy of the logs or graphical records of the "resistivity" indications or measures is, therefore, strictly dependent upon constancy of the intensity of the alternating current employed at the current electrodes, and hence it is doubly necessary that close automatic control of the generator be maintained. A novel means for this function is provided by the invention. As will become evident, by utilizing direct current pulses for signaling the resistivity logs information from subsurface to the surface, and by eliminating at the surface the distorted leading and trailing "edges" of those D.C. pulses, an extremely high degree of accuracy or fidelity in the information signaling is attained, as compared with any system wherein alternating current waves are employed for the transmission of value-representing signals. This improvement in accuracy in the information-signaling is attained largely because of the "steady state" condition of the signal circuits during the middle portion of each direct current signal pulse period. Since the effects of all transient currents, "cross-talk," leakage currents, and other varying or alternating currents may readily be attenuated to extinction during the selected middle portion of the signal pulse period, and without adverse effect upon the middle portions of the D.C. signal pulses, a truly accurate telemetering of the samples of information can be attained. And since the commutation rate may be so chosen, with respect to the speed of the electrode system along the borehole, that a sample of information for each of the several resistivity information channels is secured for each of small increments of borehole traverse, the fidelity of the produced graphic logs or records may be as high as may be desired. As an example, with a commutator shaft rotation speed of 500 revolutions per minute in an exemplary system providing four information logs, and a borehole traversal speed of one hundred feet per minute, a sample of information (resistivity measurement, for example) is secured for each information channel or log each 2.4 inches along the traversed extent of borehole. That final log produced from such samples is truly representative for all practical purposes is readily apparent.

An exemplary system according to the invention may be briefly outlined with reference to FIG. 1, which depicts in diagrammatic form the basic organization and environment of an exemplary embodiment of apparatus in a system for providing four similar logs and an N.P. log. A fluid-filled borehole B*h* extends downwardly through earth formations to be logged. A cable C*a* extends into the borehole and therein supports for traverse the logging tool L*t* containing the subsurface apparatus. The latter apparatus comprises components indicated diagrammatically within the lower part of FIG. 1 adjacent and to the right of the logging tool L*t*. The cable extends over a guide sheave P*u* and is paid out from and wound upon a winch drum W*d*, as well known in the art; and the cable sheath conductor S and insulated cable conductors 1, 2, and 3 are connected through conventional slip ring and brush means S*r* to leads S', 1' and 2' and 3' of the surface apparatus. The latter apparatus comprises components enclosed within the dash-dot line enclosure 4. Constant-intensity alternating current is supplied by a power supply unit 5 through a converter drive unit 6 and D.C. blocking capacitor C1, to respective leads 1' and S' for transmission to and from the subsurface apparatus. In the latter, the alternating current path is from conductor 1, through a D.C. blocking capacitor C2, the primaries of transformers T10 and T11, through the motor of a shaft driving unit 7, and a current commutator unit C*c*. From the latter the current is commutatively passed cyclically in discrete pulses through switch units S*w*1, S*w*2, S*w*3, S*w*4 to respective current electrodes E*c*, E*e*, E*f* and E*g*, the current then returning to the surface by way of the earth and a "remote ground" to the generator. The remote ground may be an exposed portion of the cable sheath forming conductor S, it being understood that a certain lower-end portion S*i* of the cable sheath may be covered with insulation to provide remoteness for the ground connection with respect to the electrodes.

Passage of the pulses of alternating current through respective earth-paths creates alternating electric potential fields, within which are situated pick-up electrodes such as E*a*, E*d* suitably positioned on the logging tool L*t* (but indicated at the right of FIG. 1), and exposed to detect the field potentials at their respective locations. The potentials thus sensed or picked-up are preferably taken with reference to a ground electrode inserted into the earth in the vicinity of the surface apparatus. That ground electrode will hereinafter be termed a surface ground, as distinguished from the cable sheath. The sensed potentials, (four in each signaling cycle in the exemplary embodiment of the invention), may differ widely in intensity due to differences in the current electrode and pick-up electrode configurations; and hence the sensed potentials are differently treated prior to formation of field potential-representing signals by the subsurface apparatus. The potentials sensed at E*a* and E*d* are so individually attenuated that a single amplifying means to which they are each in turn presented, may easily accommodate the differences in intensity of potential without significant distortion. Actually each of the potentials sensed at electrodes E*d* and E*a* (two potentials between E*d* and ground and two between E*a* and E*d*) exists for a short period only, the periods of existence being determined by the periodic flows of alternating current through the respective current electrodes E*e*, E*c*, E*g* and E*f*. Thus two fields are sampled, one following the other by a short interval, between E*d* and ground; and then two fields are similarly sampled between E*d* and E*a*, in a manner hereinafter more fully explained. The four field potential samples secured are passed through respective switch means 11, 12, 13 or 14, thence through respective attenuator means 15, 16, 17 or 18, and thence into respective signal channel isolating means 21, 22, 23 or 24. The isolation means are employed to feed the time-spaced potential signals of the first, second, third and fourth signal channels just mentioned into a common signal amplifier, each signal in its turn on a time-division basis. Also the isolation means serves to isolate a natural potential of continuous nature exhibited at the electrodes, from the A.C. signal channels.

The signals representing the field potential samples corresponding to the four electrode configurations mentioned, and which are produced in response to commutation of electrode current by commutator C*c*, are each in the form of a short burst of A.C. when fed through the respective isolation means 21, 22, etc. The signals are produced in turn, cyclically, and are translated, each through its respective signal channel, to a sequentially operating signal gating switch Ss which serves to connect each signal channel in turn to the input of the mentioned amplifier, with a short interval of time elapsing between disconnection of one channel and connection of the next. Switch Ss is operated synchronoously with commutator Cc by suitable mechanical interconnections, such as a shaft indicated by a dotted line, whereby the output ends of the four signal channels are closed and opened at the proper times for timed acceptance of their signals in cyclically repeated sequence by the amplifier. The latter, indicated at 25 on the block diagram, amplifies the signals fed thereto by switch Ss; and since the signals have, by means 15, 16, etc., been reduced to individual levels of comparable intensity well within the dynamic range of amplifier 25, are not significantly distorted. At the output of the amplifier the signals still are alternating in charcater; and for reasons hereinafter more fully explained, are converted into D.C. pulse signals by a synchronous rectifier unit 26 which is operated at a frequency the same as that of the A.C. signals. The rectifier unit may be operated by coil means as indicated, with power derived from transformer T10 through which the electrode current flows.

The signals appearing at the output leads of the synchronous rectifier are in the nature of D.C. pulses, with a small A.C. component superimposed thereon. These signals, four in each cycle of operation of switch Ss in the exemplary form of apparatus, are transmitted to the surface apparatus through contacts of a relay Ry3 which serve to connect the rectifier output to conductors 2 and 3 of the cable as indicated. At the surface the D.C. pulse information signals representing the field potential intensities at the pick-up electrodes are translated through the slip rings and brushes at Sr at the winch drum, to leads 2' and 3'. From the latter the information signals are passed through normally closed contacts of a relay Ry2 and translated through a signal converter means comprising a "chopper" 30, a transformer T12, and a synchronous rectifier 31. The chopper converts each D.C. signal pulse and the superimposed A.C. components into short discrete pulses which are transformed by T12 into A.C. waves of various frequencies. The basic A.C. wave burst appearing at the output of T12 and representing only the D.C. signal pulse component of the input into the chopper 30, is re-converted into a reconstituted D.C. pulse by rectifier 31, which acts to chop all other A.C. components into bursts and discontinuous pulses of very short duration. All but the reconstituted D.C. signal pulses are then removed by a low-pass filter 32 which translates on for switching and utilization only the D.C. information signals. The latter signals are fed into a signal distribution lead 33 from which each signal is selectively admitted, through a respective one of calibration-attenuation nets 41, 42, 43, 44, and a respective one of gating relay units 51, 52, 53, 54, into an individual one of signal pulse extender and amplier units 61, 62, 63, 64. Each extender and amplifier unit includes means for effectively extending the duration of each admitted D.C. pulse for the period of a complete 4-signal cycle so that from each amplifier unit there may be supplied to the respective galvonometer-recorder unit G1, G2, G3, or G4, a signal that changes significantly or is reset in value only once for each signaling cycle.

Since switching of the signal pulses into the respective galvanometer-recorder units at the surface location requires that the switching means comprised in the gating relay units be operated in synchronism with switch unit Ss of the subsurface apparatus, means are provided for such synchronous operation. These means comprise a control-pulse generating means in the subsurface apparatus, means for phantom-circuit transmission of the control pulses to the surface apparatus, and means at the surface for receiving and there using the control pulses to cause successive cyclically repeated operations of the gating relay units, whereby the first signal pulse of each cycle or group of such pulses is routed into galvanometer-recorder unit G1, the second into G2, etc. The control pulse producing means comprises a power supply unit 35 supplied from transformer T11 in the subsurface apparatus, unit 35 supplying plus and minus D.C. potentials to a control pulse generating rotary switch means 36 which is operated by motor unit 7 synchronously with sequence switch Ss. The connections and operation of units 35 and 36 is such that there is supplied to a phantom circuit comprising cable conductors 2 and 3 as one lead, and ground (cable sheath) as the other lead, repetitive series or groups of D.C. control pulses. In the illustrated system there are four D.C. pulses in each group, the first three being of plus polarity and the fourth of minus polarity, as viewed from the cable conductors 2 and 3. The D.C. control pulses are fed in turn in cyclically repetitive manner to conductors 2–3 through a lead 37 and a choke *Ch*1 connected to a tap on a resistor R101 connected across leads 2'' and 3'', as indicated. Leads 2'' and 3'' are connected to respective cable conductors 2, 3 through contacts of relay Ry3. This phantom transmission scheme permits transmission of the "sync" or control pulses without interfering with the information signal pulses concurently transmitted on conductors 2 and 3.

At the surface apparatus the D.C. control pulses appearing between conductors 2–3 and ground are recovered at the end of a terminating net 45 connected across branches of leads 2' and 3' as shown. The series of control pulses thus recovered are fed through a filter unit 46 and translated to and reformed in a circuit unit 47, amplified by a special amplifier unit 48, and fed to a control circuit unit 49 which produces new D.C. control pulses which are individually routed over respective control pulse leads to respective gating relay units as indicated. The control pulses there cause timed operation of the relay devices to pass the incoming D.C. signal pulses arriving on lead 33 to their respective recorder units.

For a satisfactory log of N.P. it is necessary to detect and indicate the relatively slowly changing variations of that potential; and since these variations fall in the frequency range from 0 to about 2 c.p.s. depending upon speed of logging, the natural potential signal may be conveyed to the surface on the first cable conductor 1, which is also employed to convey alternating current from the surface to the logging tool. Sheath and/or earth ground is the return path in both cases. Relatively simple filter means are employed at the surface apparatus to separate the N.P. signal from the higher frequency logging current; and similarly at the logging tool, filter means exclude the downgoing logging current from the N.P. electrode system, and the N.P. signal from entry into the power and current-electrode system. The N.P. signal utilizing means, including filter and amplifier units and a recorder, are collectively indicated at N.P. in the upper left in FIG. 1.

Other means and modes comprising portions of the invention not necessarily indicated in FIG. 1 will be explained and described hereinafter in connection with a detailed disclosure of the illustrated specific exemplary and preferred embodiment of apparatus according to the invention.

Figure 2A:
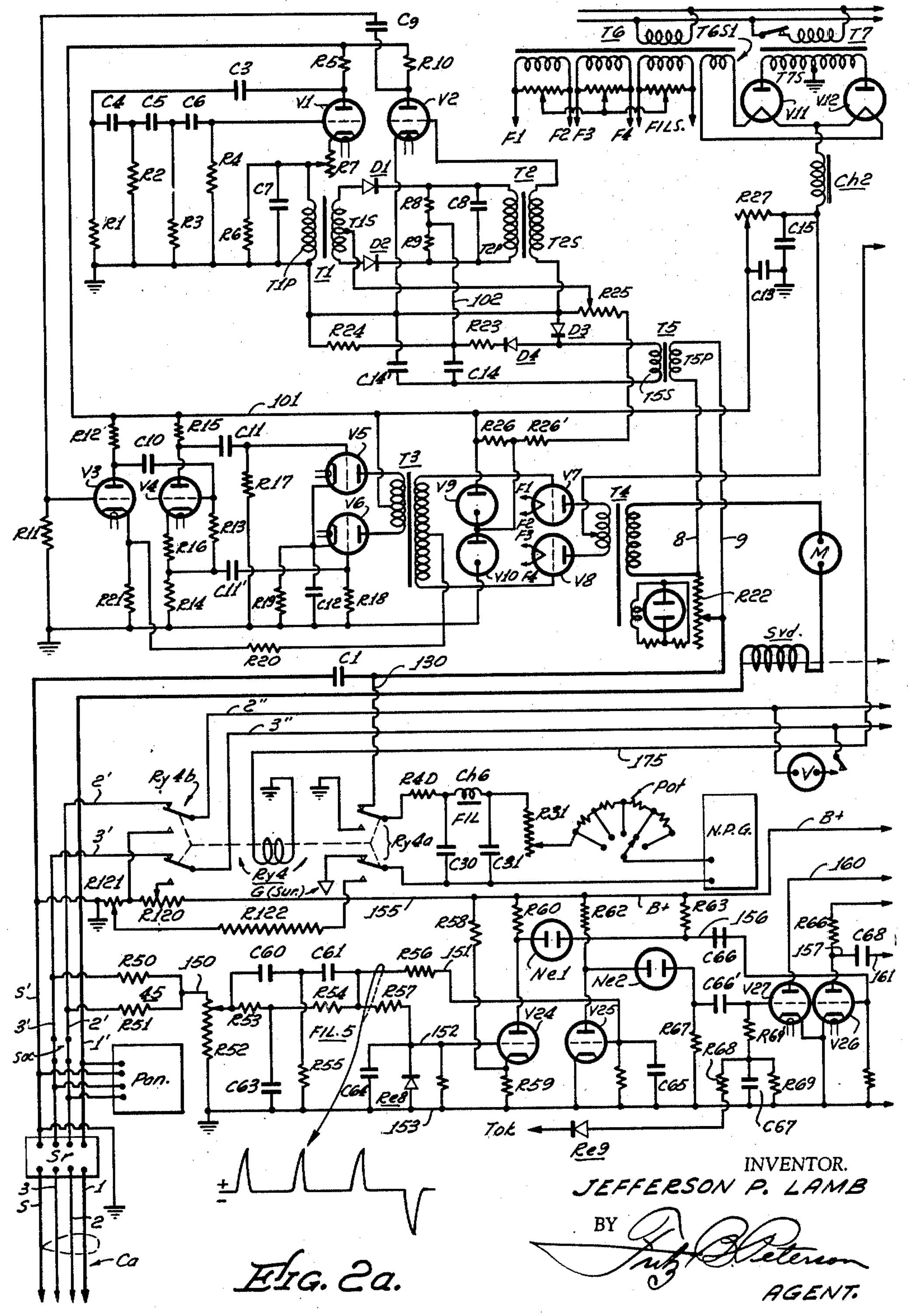
Figure 2B:
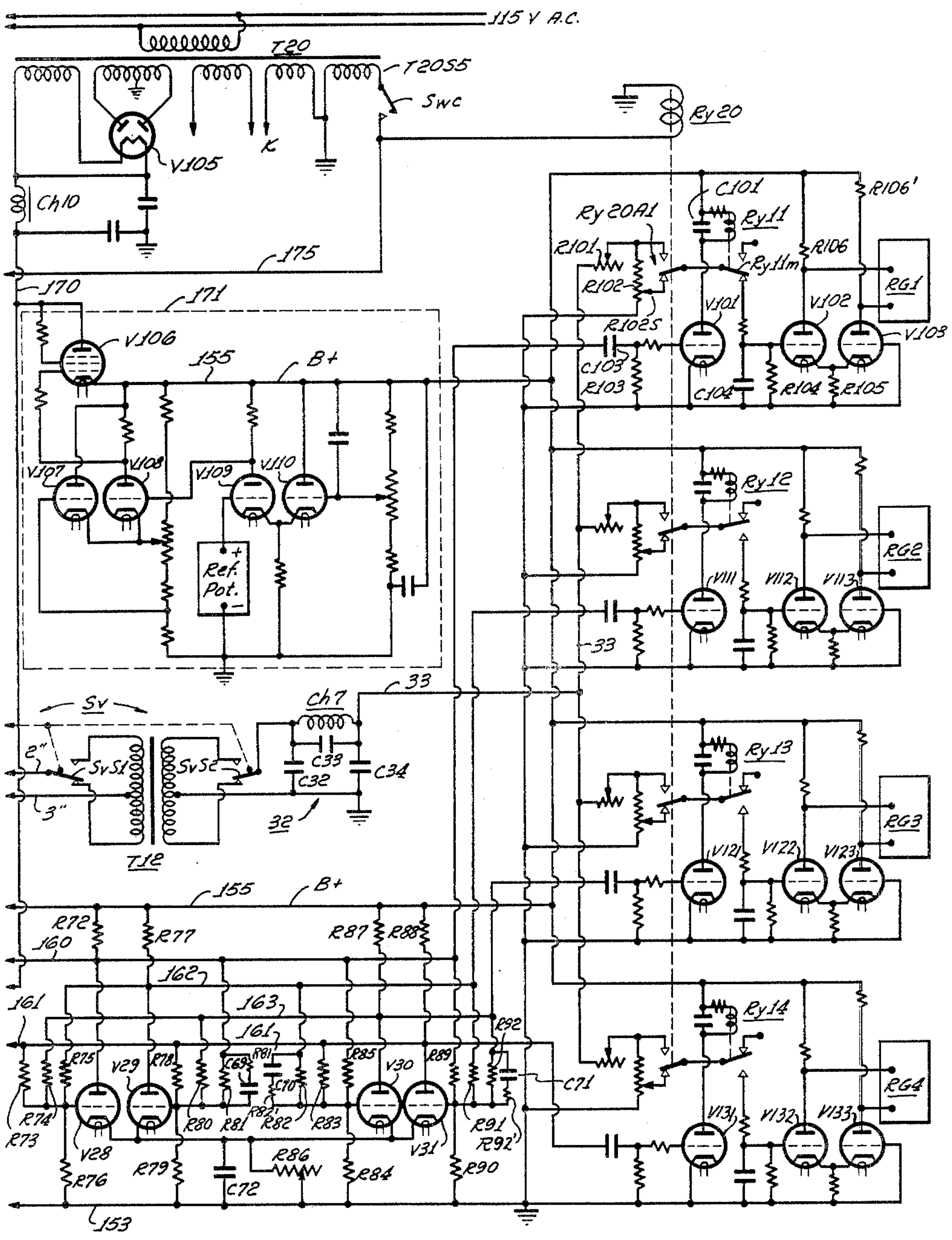

Referring now to FIGS. 2*a* and 2*b* in particular, the leads leading to conductors 1, 2 and 3 and to the sheath S, of the cable *Ca*, are designated 1', 2', 3' and S', respectively. The respective conductors and cable elements are interconnected by conventional slip ring and brush means on the winch, these interconnection means being diagrammatically indicated at block Sr at the lower left in FIG. 2*a*. Alternating current, preferably but not necessarily of 400 c.p.s. frequency, is supplied to conductors 1' and S' through a synchronous converter drive coil *Svd* in conductor 1' and a direct current blocking capacitor C1 interposed in conductor S'. As a consequency, coil Svd is normally energized during a logging traverse, and operates the reeds or movable contacts SvS1 and SvS2 (FIG. 2b) of a synchronous converter unit, as indicated by the dashed control line leading from coil Svd. The purpose of operating a synchronous converter in positive synchronism with the alternating current supplied to conductors 1' and S' will hereinafter be made more fully apparent.

*The Constant-Current Generator (Unit 5)*

An electronic oscillator is employed to generate an alternating current wave of the frequency (in this example, 400 c.p.s.) desired for the constant current supplied to conductors 1'–S'. This oscillator (see upper left of FIG. 2a) is of the resistance-capacitance phase-shift type, comprising essentially resistors R1, R2, R3 and R4, capacitors C3, C4, C5 and C6, and electron tube V1 which has a plate load resistor R5. The oscillator output is on the cathode side of V1 so that the frequency of the oscillator is not varied by load fluctuations as it would if taken conventionally off from R5, the latter being in the frequency determining portion of the oscillator circuit. The cathode circuit of V1 includes capacitor C7, resistor R6 and the primary T1P of a transformer T1 whose secondary T1S is center-tapped, all as indicated, R6, C7 and T1P are of electrical values so chosen as to resonate at the selected frequency, 400 c.p.s. The gain of the oscillator is adjusted by variation of a variable resistor R7 in the cathode circuit of V1; and the gain is set at a value just above that at which oscillation commences. A good sine wave form is secured from the oscillator, at T1. The output of T1 is applied through a unique four-terminal control device comprising a balanced variable-conductance bridge network or regulator including the primary T2P of a transformer T2, to the input of an amplifier tube V2. The regulator device or circuit includes first and second semiconductor diodes D1, D2 which operate as variable-conduction units rather than as rectifiers, two resistors R8 and R9, and a capacitor C8 which with the primary T2P is resonated at the selected frequency (400 c.p.s.). The operation of the regulator device in providing either constant current or constant voltage output from the generator will hereinafter be more fully described. The output of the oscillator as evidenced at transformer T2 is applied to the grid circuit of amplifier tube V2, and the output of the latter tube, developed across resistor R10, is applied through capacitor C9 to the input of a two-stage network comprising an amplifying tube V3 and a cathodyne phase inverter not comprising tube V4. The output of tube V4 is applied through capacitors C11 and C11' to a low-power driver stage comprising electron tubes V5 and V6, and the output of that stage is applied through a transformer T3 to a pair of power output stage tubes V7 and V8 which provide power to the primary of a transformer T4. In the preferred form of apparatus the latter transformer supplies the constant intensity alternating current to the aforementioned conductors 1'–S' through means elsewhere herein described.

As indicated in FIG. 2a, the output of tube V2 is applied to the grid circuit of amplifier V3 across resistor R11, and the output of V3, developed across resistor R12 is coupled to tube V4 through capacitor C10 and resistors R13 and R14. The split output of V4, developed across resistors R14–R15 provides oppositely phased inputs for driver tubes V5 and V6, whose grids are excited through capacitors C11 and C11' and are biased through resistors R17 and R18, respectively. The cathodes of V5 and V6 are connected to ground by way of resistor R19 and capacitor C12 as indicated. A feed-back is provided from the secondary of transformer T3 to the cathode of V3, through resistor R20. The cathode of V3 is connected to ground through resistor R21. Plate potential is supplied to tubes V1, V2, V3, V4, V5 and V6 by way of a lead 101 connected by way of an adjusting net (hereinafter described) to the output of a plate voltage supply means; and anode potential for tubes V7 and V8 is supplied as indicated from the same supply means. Lead 101 is provided with an A.C. by-pass capacitor C13 connected between that lead and ground.

The 400 c.p.s. generator output transformer T4 has one secondary terminal connected to lead 1' through a current meter M and the synchronous converter drive coil Svd, and its other secondary terminal connected to capacitor C1 in lead S' through a variable resistor R22 which is used to provide a series sample of the current output of T4 for regulation purposes. As will be explained hereinafter, a shunt sample is used in those cases wherein output voltage intensity is to be maintained constant. The series control potential is derived across the current-conducting portion of R22 and energizes the primary of a transformer T5 through leads 8, 9. The stepped-up output from the secondary T5S is applied to a voltage doubler-rectifier and filter net for derivation of a D.C. regulator voltage for application to the previously mentioned regulator device or variable conductance bridge network. The double-rectifier and filter net comprises diodes D3 and D4 and filter elements C14, C14', R23 and R24, with R23 providing overload protection for the diodes. The D.C. regulator potential, derived from the junction of R23 and C14, is applied to the bridge circuit at the junction of resistors R8 and R9 (which preferably are of equal value) through a lead 102, the thus-applied potential being applied in opposition to a selected D.C. reference potential which is applied to the mid-point of T1S. The value of the reference potential thus applied in opposition to the regulator potential is selected by variation of a potentiometer resistor R25 which is connected between ground and a potential divider connected to a voltage regulator V10. Lead 101 is supplied at, for example, 300 volts D.C. potential, whereby, by means of potential-dropping resistors R26 and R26', with regulating gas-filled tubes V9 and V10, there is supplied to the high-potential end of R25 a D.C. potential of, for example, 10 volts. The regulator circuitry operates in the following manner to maintain constant current output into conductors 1'–S': with an ammeter M inserted in the output of T4, R25 is adjusted until the meter indicates the desired value of electrode current. This current flow provides a sample voltage drop through the active portion of series-connected resistor R22 exactly sufficient, when doubled and rectified and filtered by D3, D4, C14, C14', R23 and R24, and applied through lead 102 and R8 and R9, to balance the potential picked up on R25 and applied to the midpoint of secondary T1S. In this balanced condition the conductivity of D1 and D2 (which as hereinbefore noted do not operate as rectifiers) is such as to permit transfer of exactly the amount of energy or power from T1S to T2P necessary to cause the power supply unit controlled by V2 to provide the selected output current through the secondary of T4. If the latter output tends to commence to decrease, due to an increase in formation resistivity adjacent the logging tool or due to increase in cable conductor resistance, etc., the sample potential picked off from resistor R22 similarly tends to drop, causing an unbalance of the D.C. potentials applied to D1 and D2 and in the direction to increase their conductivity, whereby transfer of energy from T1 to T2 increases and the output of T2 is increased to bring up, through the action of V2, V3, V4, etc., the output potential of the power supply at T4 sufficiently to overcome the tendency of the output current to decrease. Similarly, if the output current at T4 tends to increase, due to a decrease in current path resistance in the cable and/or earth formation, the increasing potential picked up at R22 causes an opposite unbalance of potentials applied to D1 and D2, lessening the output at T2 and, through V2, etc., decreasing the output potential of the power supply at T4.

Figures 4, 4A, 6, 6A:
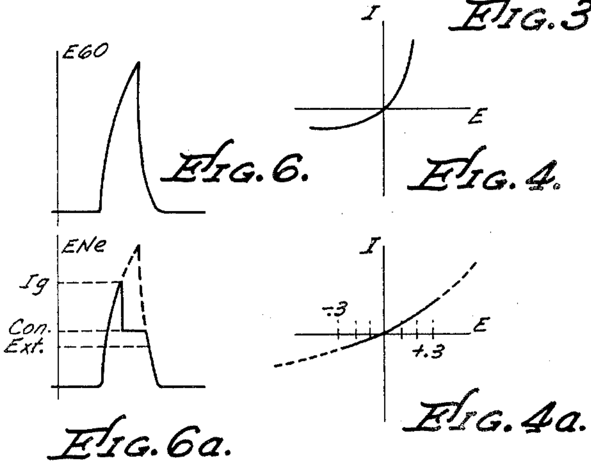

The control or current regulating system whose operation is described in the preceding paragraph is automatic, and, quite unlike carbon pile and other current regulators, is substantially instantaneous in its action and independent of phase characteristics of the load and not subject to the loop oscillations of conventional A.C. servos. As is evident, or will hereinafter become evident, such substantially instantaneous current-value correction is requisite to the extremely arcuate logging provided by applicant's exemplary system. The control device or regulator, employing the diodes D1, D2 as variable conduction devices (hence silicon junction type diodes, rather than germanium diodes, are used) in a balanced network, not alone provides instantaneous control, but eliminates the distortion incident to use of a single diode control circuit. In explaining in further detail the functional operation of diodes D1, D2, reference is made to FIGS. 4 and 4*a*. In FIG. 4 is depicted a typical voltage-current or conduction characteristic curve for a diode, plotted on Cartesian coordinates representing voltage (E) and current (I) as indicated; and in FIG. 4*a* is depicted a considerably magnified central portion of FIG. 4, illustrating the portion of the characteristic curve over which operation of diodes D1, D2 is limited in operation of the current generator regulating circuit of the invention. It will be noted that the characteristic curve is that of a diode having substantially no "contact" potential, i.e., such as that of a germanium diode. The curve, in the region very near the origin of the coordinate axes, approaches closely a straight line, as is indicated in the magnified part illustrated in FIG. 4*a* showing the part of the curve extending from $E=-.3$ v. to $E=+.3$ v. in full line and parts of the extension of the limbs of the curve above and below those values in dotted lines. The electrical values of the regulating circuit and the potentials supplied thereto are so chosen as to restrict operation of the diodes D1, D2 to a portion of their characteristics well within the substantially linear section above and below the zero of the coordinate axes. Since the midpoints of secondary T1S and primary T2P (FIG. 2*a*) are in effect grounded for the 400 c.p.s. wave, and since that wave is but a very small part of the current passed through diodes D1, D2, the A.C. wave cannot seize control of the control circuit. When the D.C. sample potential (derived from R22) is negaive with respect to the reference poential derived at R25, the diodes operate on that part of the characterisic extending from and to the right of the coordinate axes in FIG. 4*a*, and conversely for the lower limb of the characteristic; whereby in the former case the diodes are more conductive and more signal is supplied to V2 to increase the generator output, and in the other case the diodes are less conductive and supply less signal to V2, to decrease the output. It will be understood, of course, that it is the output voltage across the secondary of T4 that is varied, so the current therethrough is maintained constant within a very narrow range of values. It should be noted that if it is desired to provide a constant-voltage output from the generator, the sample voltage should be taken from a resistor shunted across the generator output, rather than from a series-connected resistor as shown.

Anode potential is supplied to the previously mentioned lead 101 through an adjustable filter network comprising capacitors C13, C15, variable resistor R27, and a choke Ch2, from a supply unit comprising rectifier tubes V11, V12. The rectifier cathodes are energized from the secondary T6S1 of a transformer T6, and the anodes are energized by a center-tapped secondary T7S of a transformer T7. The primaries of T6 and T7 are connected to any suitable A.C. supply line, such as a 115 volt A.C. line as indicated. Additional secondary coils of transformer T6 are provided for supply of current for electron tube filaments and heaters of the current generating unit, as indicated.

*The Subsurface Apparatus*

Figure 3A:
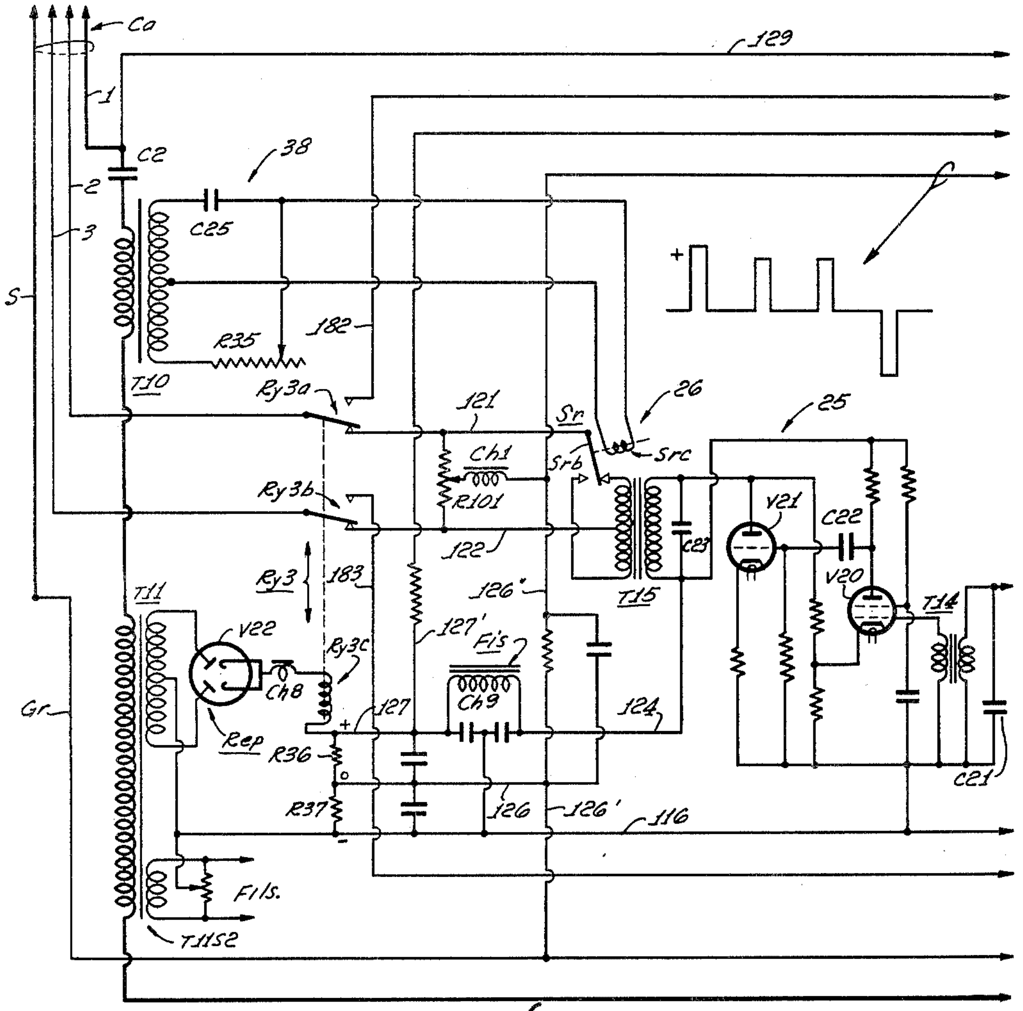
Figure 3B:
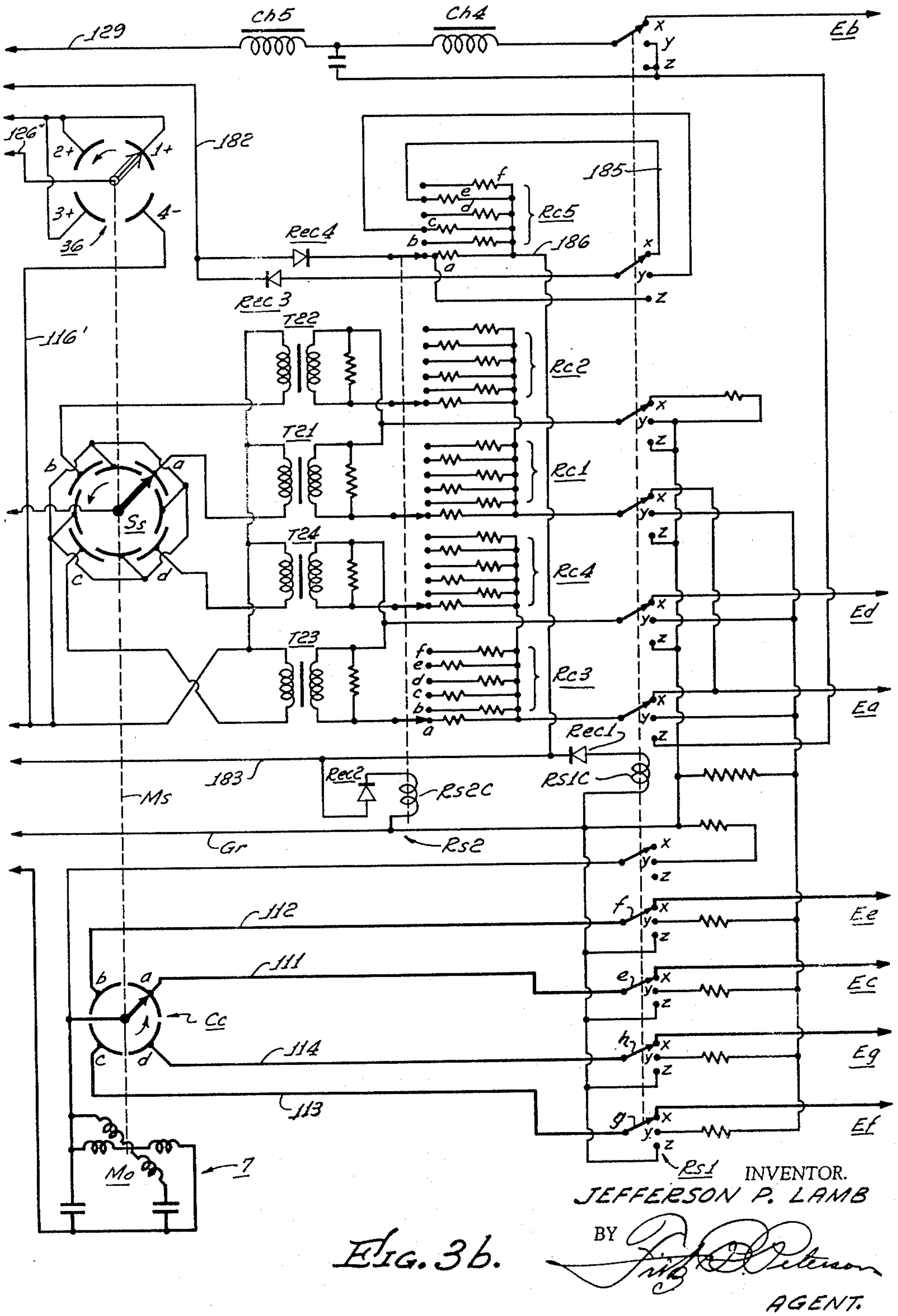

Referring now to the composite formed by FIGS. 3*a* and 3*b*, cable conductors 1, 2 and 3 and sheath conductor S are diagrammatically indicated at the left of FIG. 3*a*. The 400 c.p.s. alternating current traversing conductors 1 and S may be traced from conductor 1 through D.C. blocking capacitor C2, through the primaries of transformers T10 and T11 in series, on through driving motor **M*o* of unit 7 (FIG. 3b) and into the rotary member or brush of a current commutating switch C*c***. From the rotary brush the current passes through, successively, stationary contacts *a, b, c,* and *d* and to respective leads 111, 112, 113, and 114. The latter leads are connected to respective movable contacts *e, f, g,* and *h* of a multi-deck rotary switch device **R*s*1 having an actuating or stepping coil R*s*1C and shaft means (indicated by dotted line) for operating the switches of the several decks. In the normal or "operating" position of R*s*1 as shown, the current pulses commutated into leads 111, 112, 113 and 114 pass into respective current electrodes E*c*, E*e*, E*f*, and E*g*** which are diagrammatically depicted at the lower right in FIG. 3*b*. As hereinafter more fully explained, the commutation of the electrode current is so accomplished that there is no interruption of current flow through the cable conductors 1 and S. This is due to a slight overlap of the rotary brush of the commutator **C*c*** with adjacent stationary contacts *a, b, c,* and *d* as the rotary brush passes from one to another of the stationary contacts. The current continues (now diverted cyclically into four different paths), through the earth adjacent the current electrodes, **E*c*, E*e*, E*f*, and E*g*, and to a relatively remote ground terminal formed by an exposed, uninsulated portion of the cable sheath conductor S** disposed within the liquid-filled borehole.

The electrode system provided on the subsurface tool which is traversed along the borehole may be as desired or required for the types of logs required. In the apparatus herein disclosed by way of preferred example and which is adapted to secure information for four resistivity logs and an N.P. log, seven electrodes are situated specific distances **D*e*** from the lower end of the subsurface tool according to the following table:

| Electrode: | De, in. |
|---|---|
| Ea | 0 |
| Eb | 8 |
| Ec | 16 |
| Ed | 32 |
| Ee | 64 |
| Ef | 136 |
| Eg | 240 |

It is understood that the electrodes are insulated from the body of the tool in accord with conventional logging tool construction practice, and that electrode **E*a* is as close as practicable to the bullhead end of the tool body (herein considered to be at zero distance from the tool end). The exterior surface of the tool body is insulated from borehole fluid, as is a lower end portion of the cable sheath, S*i* (for example, the lowermost 100 feet of the cable is enclosed in an insulative jacket), whereby "ground" for the electrode currents is relatively remote from the logging tool electrodes. Electrodes E*b* is in this example employed for detection of N.P. In the exemplary form of apparatus depicted, the cable sheath S, as a ground, is used as a return electrode for current for the "short normal," "long normal," "short lateral," and "long lateral" resistivity logs; and the potential pick-up for the "lateral" resistivity log informations is between electrodes E*a* and E*d* with the potential pick-up for the "normal" resistivity log informations taken between electrodes E*a* and sheath S. For convenience in reference, the current electrodes (C*u*1 and C*u*2**) and the potential electrodes (P1 and P2) for the four resistivity logs may be tabulated as follows:

| Information or log | Cu1 | Cu2 | P1(A) | P2(D) |
|---|---|---|---|---|
| Short normal | Ec | S | Ea | S |
| Long normal | Ee | S | Ea | S |
| Short lateral | Ef | S | Ed | Ea |
| Long lateral | Eg | S | Ed | Ea |

The potentials forming the information required for production of the "resistivity" logs, in the form of 400 c.p.s. waves detected at the pick-up electrode pairs, are detected at and derived from the electrodes as indicated in the preceding table, and in the order there listed; and the potentials are translated through respective decks of rotary switch device Rs1 and registered across separate respective input circuits through individual attenuation devices. The input circuits comprise primaries of respective isolation transformers T21, T22, T23, and T24. The secondary windings of the latter transformers are connected, in sequential order by a commutating switch Ss, to a common amplifier for signal amplification. The amplification is preparatory to conversion of A.C. signals to D.C. signal pulses which are in turn impressed upon conductors 2 and 3 of the cable. During a normal logging traverse the movable or rotary contacts of all banks or decks of switch Rs1 are in contact with respective stationary contacts herein illustrated as the upper, or "X" contacts of series of three such sets of contacts, X, Y, and Z. Thus the X-position of switch Rs1 is the normal operating position. Means whereby the switch may be rotated at will under control of the operator will hereinafter be disclosed; it being sufficient at this point to note that the swich may among other things be employed to bring into action certain indicating means whereby positional status of components of the subsurface apparatus may at will be determined during a logging traverse. The attenuation means mentioned comprises four sets of resistors, Rc1, Rc2, Rc3, and Rc4, one set for each of the resistivity information signal channels, in the order previously mentioned; and each set comprising resistors wih sub-designations *a*, *b*, *c*, *d*, *e*, and *f* as indicated in set Rc3.

It will be noted that the potential in the first resistivity log information channel (short normal), picked up between electrodes Ea and S while the current electrodes Ec and S are conducting, is concurrently applied through attenuation means Rc1 to transformer T21 and through Rc2 to transformer T22; but since T22 has its secondary circuit open at commutating switch Ss (*b*) at that time, the signal will be passed into the movable brush of Ss through only T21, it being noted that the signals progress from right to left in FIGS. 3*b* and 3*a*. Similarly, the potential in the second resistivity log information channel (long normal), picked up between the same electrodes Ea and S, is concurrently applied to both of transformers T21 and T22; but at that time the secondary circuit of T21 is open at Ss (*a*) and the signal is passed through only T22. Similar considerations apply with respect to the third and fourth resistivity information channels, the signals therefor being picked up between Ea and Ed and passing respectively through T23, and T24 into the rotary brush of Ss. As indicated, each of sets Rc1, Rc2, Rc3, and Rc4 comprises a plurality of resistors (for example, six resistors). At any logging traverse of a given extent of borehole, only one of the resistors of a respective set is connected in series with the primary circuit of a corresponding transformer. The purpose of the selected resistor in each bank is to attenuate the A.C. signal passing therethrough to a predetermined extent whereby at the output sides of transformers T21, T22, etc., the signals in the four separate channels will be attenuated to amplitudes within a signal-level range that can readily be accommodated by a single, common, amplifier to which all of the signals are fed for amplification. It is evident that the intensity of the potential picked up for the short normal log (between Ea and S when current is traversing electrodes Ec and S) is much greater than that picked up for the long normal log, and many, many times greater than that picked up for the lateral logs. Since economy of power-consuming electronic apparatus in the logging tool dictates use of a common signal amplifier for all the signals, the inputs to the amplifier from the separate signal channels are purposely attenuated to intensity levels well within a range accommodated by a single amplifier. The several resistors comprised in a given attenuation means Rc1, etc., are of values so selected that the log produced from a given electrode configuration may be of any prescribed or selected sensitivity within a group of sensitivities determined by the resistor values. Thus for resistivity logs of 10-ohmmeter sensitivity, the lowermost resistors (*a*) of the four sets, shown connected to the transformer inputs, are used. For 20-ohmmeter logs or curves, the next resistor (*b*) in each of the groups is switched into the input, etc. For sensitivities intermediate the values provided for by the several resistors in each attenuation sets Rc1, Rc2, etc., a circuit means is provided in the surface apparatus. For example, if resistors Rc1*a*, Rc1*b*, etc., of Rc1 provide respectively for sensitivities of 10, 20, 40, 80 ohmmeters, etc., a log may be produced at 15 ohmmeters sensitivity by utilization of the mentioned surface circuit means. The latter will hereinafter be more fully described and explained. Selection of a resistor from each of sets Rc1, Rc2, etc., is by means hereinafter described.

The 400 c.p.s. wave signals representing the information for the resistivity logs and translated along first, second, third, and fourth signal channels respectively comprising transformers T21, T22, T23, and T24, are in succession picked up by the rotating brush or contact of switch Ss from contacts Ss*a*, Ss*b*, etc., and are introduced or applied to the common signal amplifier by way of the primary of an input transformer T14 to which the rotary brush is connected. An interference or arc suppression capacitor C21 is provided between the moving contact of switch Ss and a "floating" return lead 116 to which inter-contact shorting bars of switch Ss are connected. By the provision of the shorting bars in switch Ss, and the connections indicated, substantially nothing but bursts of 400 c.p.s. signal are impressed upon the amplifier through input transformer T14.

The subsurface signal amplifier consists essentially of a two-stage signal amplifier comprising electron tubes V20 and V21. The signal is impressed upon the signal grid of V20, and the amplified signal coupled through capacitor C22 to the grid of V21. The output of V21 is coupled to rectifying means in unit 26 for converting the bursts of 400 c.p.s. signal into direct current pulses. The coupling is by way of a transformer T15 into whose primary the output of V21 is passed. The secondary of transformer T15 is center-tapped and is connected across the fixed contacts of a synchronous rectifier means Sr having a movable center contact or blade Sr*b* driven by a coil Sr*c* which is energized by 400 c.p.s. power derived from the secondary of the aforementioned transformer T10. The synchronous rectifier serves to rectify the 400 c.p.s. signal waves into direct current pulses which are applied through leads 121, 122, and appropriate sets of contacts Ry3*a*, Ry3*b* of a relay, Ry 3, to conductors 2 and 3 of the cable. The direct current pulses, whose respective amplitudes mathematically represent (according to the ratios of the active resistors in Rc1, Rc2, etc.) the intensities of the signals picked up at the potential electrodes, are transmitted as the information-representing signals from which four resistivity logs are to be derived or produced by the surface apparatus. The direct current signal pulses are transmitted in groups of four, one group for each rotation of switches Cc and Ss, with each signal group containing a signal for each of the "resistivity" information channels. Switches $Sc$ and $Ss$ are synchronously operated with a third rotary switch, 36, by a common switch shaft indicated by dotted line $Ms$. The switch shaft is driven at a substantially constant speed of rotation by the aforementioned motor $Mo$, which may include as part of unit 7 a speed-reducing gear box. The mentioned third rotary switch, 36, is employed for producing what may be termed control pulse or "sync" signals for synchronizing certain of the surface-apparatus operations with certain subsurface-apparatus operations, as will presently be described and explained. Switch $Ss$, which samples the four resistivity informations or signals, each in turn at a rate of one sample per channel per revolution of shaft $Ms$, is provided with short-circuiting bars mechanically situated between the signal-conducting contacts $Ssa$, $Ssb$, etc., whereby the four resistivity signals translated into transformer T14 are discrete, time-spaced, 400 c.p.s. signals, each completely free of any interference from the others. The character of the four signals entering T14 is indicated in FIG. 5 which shows exemplary signals $Si1$, $Si2$, $Si3$, and $Si4$.

Figure 5:
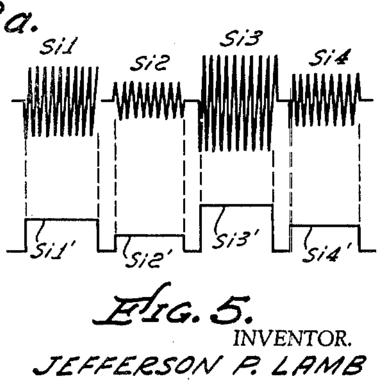

The resistivity signals, after amplification by V20 and V21 and synchronously rectified by $Sr$, are in the form of discrete time-spaced direct current pulses, such as $Si1'$, $Si2'$, $Si3'$, and $Si4'$, indicated in the lower part of FIG. 5. The synchronous rectifier, is operated by power derived from the same current that is emanated from the current electrodes, hence is operated synchronously with the 400 c.p.s. signals picked up at the potential electrodes. As previously mentioned, the driving power for the synchronous converter coil is derived through transformer T10; and to attain maximum utilization of available signal, the phase relationship of the driving power may be suitably adjusted by a phase-shifting network 38 comprising capacitor 625 and a variable resistor R35. Thus the vibrating contact $Srb$ of the converter may be caused to open and close with the opposed "fixed" contacts at times such as to recover a maximum of signal energy with a minimum of current break at the contacts. A small component of 800 c.p.s. ripple is, of course, superimposed upon the D.C. pulses applied to leads 121, 122 by the converter; but this is of no material consequence and is readily removed from the signals by filter means in the surface apparatus, as will presently be described and explained. The D.C. signal pulses are transmitted through assigned contacts of relay Ry3, which as indicated is energized to hold the D.C. signal circuit closed at all times alternating current passes to the current electrodes through the primary of transformer T11. As will hereinafter be explained in connection with the calibration means and procedure of the invention, relay Ry3 is also employed to connect conductors 2 and 3 to switch-controlling and indicating circuits when the alternating current supply to conductor 1 is opened or terminated.

As is evident from an examination of FIG. 3$a$, transformer T11 is employed not alone for energizing relay Ry3 through a rectifier means $Rep$ comprising a rectifier tube V22, but also for supplying power for the aforedescribed signal amplifier and for the "sync" or control pulses produced by the action of switch 36. Filament power is derived from an auxiliary secondary $T11s2$ of T11; and direct-current power is provided through filter means indicated at $Fis$, to the amplifier anode circuits (via lead 124), and to switch 36. The power supply circuitry includes resistors R36, R37 bridged in series across the rectifier output, and thus a neutral lead 126 connected to their midpoint may be provided, with respect to which leads 127–124 are positive and lead 116 is negative. Neutral lead 126 is connected to the cable sheath through a lead 126′ and to the rotary contact of switch 36 through a lead 126″. The first, second, and third fixed contacts of switch 36 are connected as indicated through lead 127′ to positive supply lead 127; and the fourth fixed contact of switch 36 is connected by a lead 116′ to negative supply lead 116. Thus as the movable contact of 36 rotates, lead 126″ is for three separated periods made positive and then for the fourth period made negative, with respect to the cable sheath. Lead 126″ is connected through choke coil $Ch1$ to an adjustable tap on resistor R101 bridging leads 121 and 122. Thus there is applied to cable conductors 2 and 3 (considered as a single conductor) and the cable sheath, repetitive series of D.C. "sync" or control pulses, each series comprised of first, second and third pulses of positive (+) polarity and a fourth pulse of negative (−) polarity. A complete series of these control pulses is diagrammatically depicted below the horizontal reach of lead 126″ in FIG. 3$a$. The pulses are suitably separated in time, as indicated in the diagram; and are transmitted to the surface appartus over cable conductors 2 and 3 as a "phantom" lead and the cable sheath. The means and mode for utilizing the control pulses are hereinafter explained.

A natural potential (N.P.) signal is picked up between electrode $Eb$ and a ground electrode provided at the surface of the earth. This signal, of slowly varying D.C. character with significant variations in the 0 to 2 c.p.s. range, is passed through chokes $Ch4$, $Ch5$ (FIG. 3$b$), and a lead 129, to cable conductor 1. The N.P. signal is prevented from entering the A.C. power lead in the subsurface apparatus by D.C. blocking capacitor C2.

The D.C. information signal pulses (with a small superimposed A.C. wave comprising harmonics of the 400 c.p.s. signal wave) and the D.C. control pulses as well, are somewhat distorted in the court of transmission to the surface apparatus due to the inherent characteristics of the cable. However, as will presently be made evident, this distortion is not detrimental in the case of either the information signals or the control pulses, because both the distorted leading and trailing portions of the information pulses are eliminated, and the control pulses are employed only in the creation of relay-operating pulses of distinctly different character.

*Surface Apparatus, Signal Reception and Utilization*

Referring now to FIG. 2$a$, the N.P. signal developed between electrode $Eb$ and ground appears between conductor 1 (lead 1′) and the aforementioned surface ground electrode inserted in the earth and designated G($Sur$). The N.P. signal current flows through conductor 1, lead 1′, coil $Svd$, meter M, secondary of T4, part of resistor R22, and a lead 130 to normally closed contacts $Ry4a$ of a normally relaxed relay Ry4. From the latter the current flows through a resistor R40 and choke $Ch6$ of filter $Fil$, through a resistive net comprising adjustable resistance R31, to N.P. recording galvanometer NPG; and the current returns from NPG to the surface ground electrode G($Sur$) by way of the lowermost of relay contacts $Ry4a$. Thus in normal logging operations an N.P. curve or log is obtained, it being understood that the record medium is moved in proportion to traverse of the tool $Lt$ through or along the borehole in a well known manner by known means.

The upcoming resistivity information signal pulses arriving on cable conductors 2 and 3 are translated through the slip ring and brush structure of the cable winch and onto leads 2′–3′ (FIG. 2$a$). These D.C. pulses are passed through normally closed relay contacts $Ry4b$ of relay Ry4, and leads 2″–3″, to the input of the synchronous chopper-rectifier $Sv$ (FIG. 2$b$), driven by the previously mentioned coil $Svd$. The input contacts of this device, operating at the frequency of the A.C. through coil $Svd$, chop each of the incoming D.C. signal pulses into many D.C. pulses of briefer duration, and the latter are applied oppositely in alternation at the chopping rate to the center-tapped primary of a transformer T12. Thus the principal ouput at the secondary of T12 is bursts of 400 c.p.s. alternating current of approximately square wave form; one burst for, and of intensity comparable to, a respective D.C. input pulse. The 800 c.p.s. wave of small magnitude that was transmitted with and superimposed on the D.C. signal pulses in the subsurface apparatus, is also chopped by the chopper section SvS2 of Sv and appears at the secondary of T12 as an assemblage of 800 c.p.s. waves and harmonics thereof. The output of T12 is rectified by a second set of contacts SvS2 of converter Sv, the two fixed contacts thereof being connected across the secondary of the transformer and the output being taken off the vibrating contact and a mid-point tap on the secondary winding of T12 as indicated. Since the D.C. chopping at SvS1 and the rectification at SvS2 are effected synchronously by concurrent operation of the two movable contacts by coil Svd, as indicated by the dotted lines interconnecting the respective named elements, the output at SvS2 is a combination of a series of D.C. pulse signals and bursts of extraneous A.C. waves of 800 c.p.s. and higher frequencies superimposed on the D.C. signal pulses. The desired signal output is of much greater intensity than the extraneous unwanted A.C. component, and the latter if readily separated from the former by appropriate conventional filter means such as that shown at 32 and including choke *Ch7* and capacitors C32, C33, and C34. It may be here noted that the synchronous chopping and re-rectification and filtering of the upcoming D.C. pulse signals provides a novel and highly efficient mode of eliminating all A.C. components from the signal, since the chopping cuts all of the incoming waves and signals into bits, converting each wanted D.C. signal into what may be termed a modified 400 c.p.s. square wave A.C. signal, and converting all the undesired A.C. input components into short bursts of A.C. wave of 400 c.p.s., 800 c.p.s., and higher frequencies. The desired signal component appearing at the output of T12 in the form of bursts of 400 c.p.s. square wave signal, is rectified by SvS2 into discrete D.C. pulse signals. Since the desired part of the output of SvS2 is now in the form of discrete D.C. pulses and all of the undesired part of the output is A.C., the latter is readily eliminated by the described filter. The original isolated ungrounded D.C. signals are at this stage converted and referred to ground for easy amplification by means hereinafter described. The filtered output signal comprises one reconstituted D.C. pulse for each resistivity information channel in each commutaton or signaling cycle; that is, the signal appearing on lead 33 (FIG. 2*b*) at the output of the filter unit 32 is in the form of repetitive groups of four time-separated D.C. pulses per group. The first, second, third and fourth pulses of each group are by means presently described switched or routed into respective individual resistivity signal channels for utilization in producing the aforementioned short normal, long normal, short lateral and long lateral resistivity curves or logs.

*Surface Apparatus—Control Pulse Utilization*

Referring again to FIG. 2*a*, and recalling that so-called "sync" or control pulses produced by action of switch 36 in the subsurface apparatus were applied between the cable sheath S and conductors 2 and 3 as a phantom pair, the D.C. pulses thus transmitted appear at the surface apparatus between conductors 2 and 3 (and 2′ and 3′) as one lead, and the sheath ground as the return lead. These D.C. control pulses are extracted at the surface apparatus by connecting one lead to ground (sheath) and another lead to a termination network 45 interconnecting leads 2′ and 3′. The termination network comprises resistors 50, 51 connected in series between leads 2′ and 3′ to provide a mid-point junction to which a control pulse lead 150 is connected. The control pulse signals in repetitive groups of three positive pulses and one negative pulse appear across resistor 52 connected between lead 150 and ground, and a portion of the thus manifested control signals is applied, through appropriate A.C. rejection filter means *Fil* 5, to novel circuitry which reshapes the pulses to provide precisely timed pulses of special electrical configurations, the latter pulses being in turn amplified and used in another novel circuit to control operation of respective signal gating relays interposed in the four resistivity signal utilization circuits. The latter relays are so operated as to perform the signal routing function mentioned in the preceding paragraph. Filter *Fil* 5 comprises a twin-T network to remove 400 c.p.s. "cross-talk," and other filter elements to remove extraneous A.C. potentials. The twin-T net comprises capacitors C60, C61, and C63 and resistors R53, R54, and R55; and the remaining filter elements comprise C64 and C65 and resistors R56 and R57.

The control signals, in repetitive groups each comprising three + pulses followed by one − pulse, as they appear at the outlet of filter *Fil* 5, are of character indicated by the wave form depicted adjacent to that filter in FIG. 2*a*. The distortion from the originally created square wave form is due to transmission through and from subsurface apparatus to the output side of filter *Fil* 5. By operation of means next to be described and for purposes and reasons presently explained, the positive-going pulses are separated from the negative-going pulses and are passed into and through respective novel pulse reformation circuits wherein are created new corresponding pulses of extremely sharp wave front. The pulses of both polarities appear between ground and the junction of R56–R57 at the output end of filter *Fil* 5. A rectifier *Re8* connected between lead 152 and ground lead 153 shorts out or eliminates all negative-going pulses from the input circuit of a positive-pulse amplifier tube V24 which is normally biased close to the cut-off point (near or at the non-conducting state). Thus only the positive-going control pulses are effective in causing or increasing conduction through V24. A second control pulse amplifier tube, V25, has its input circuit connected to lead 151; and this tube is normally operating at zero bias, i.e., is normally fully conducting. Thus the positive control pulses appearing on lead 151 do not significantly change the conduction status of V25; however, arrival of the negative-going (fourth) control pulse on lead 151 causes V25 to cease conduction for a brief interval. The normal negative bias for V24 is supplied by means of resistors R58, R59 connected between a + anode voltage supply lead 155 and ground, with a cathode connection to V24 as indicated. V24 has an anode load resistor R60 connected to supply lead 155; and similarly, V25 is provided with anode potential through a load resistor R62 likewise connected to lead 155.

In consequence of the circuitry and connections described in the preceding paragraph, arrival of each 4-pulse group of control pulses initiates one of repetitive cycles of events and sequential control operations. For convenience in describing those events and operations and the apparatus involved, the control pulses will be numbered in the order of their creation and arrival at the surface apparatus. Thus pulses numbers 1, 2, and 3 are of + polarity and pulse number 4 is negative.

When control pulse number 1 arrives at VT24 it causes conduction through that tube, and the resulting increasing voltage drop across R60 causes, at a certain voltage drop value, breakdown and conduction through a neon tube N*e*1 connected as indicated. The latter tube "ignites" or passes from the non-conducting state to a fully conducting state within an extremely short period of time, for example, within one microsecond. Referring also to FIGS. 6 and 6*a*, the graph of FIG. 6 illustrates the wave form of a + pulse as applied to the input of V24, and FIG. 6*a* illustrates the concurrent voltage across N*e*1. The circuit elements are chosen to be of values such that as the voltage across R60 reaches a selected value more than 30 volts above the extinction voltage (E*xt*) of N*e*1, the latter conducts. The "ignition" voltage level is indicated as I*g* on FIG. 6*a*, and the extinction voltage at E*xt*. At the instant N*e*1 conducts, the voltage across N*e*1 suffers a very rapid drop of, for example, about 30 volts to a conduction level indicated at *Con*, in a period of approximately one microsecond, thereby creating on lead 156 an extremely sharp negative-going output pulse. The latter pulse, translated through a coupling capacitor C66, is applied to the input circuit of an amplifier tube V26 for amplification and phase inversion. At the output of V26, across anode load resistor R66, there is thus produced a sharp decrease in voltage drop (rise in potential) on lead 157. That is, a very sharply rising + pulse is produced on lead 157. Conduction through Ne1 terminates when the trailing end of the incoming pulse drops to the extinction level E*xt*, as indicated in FIG. 6*a*. The just-described circuit operations are repeated for each of the incoming + control pulses, whereby there appears on lead 157 a series of three time-spaced + pulses of very steep wave front.

Arrival of a negative-going sync or control pulse from the subsurface apparatus initiates a somewhat similar sequence of circuit operations, but through a separate chain of elements, to produce a reformed sharp-front pulse for use with the three preceding + pulses in operations hereinafter described. The incoming − control pulse has no appreciable effect on V24 since that tube is normally biased substantially to cut-off. The pulse is, however, applied via lead 151 to the input of amplifier tube V25, which, as before stated, is normally conducting. The negative pulse briefly terminates or greatly decreases conduction through V25 and thus causes a rise in potential at the anode of V25. This change of potential follows closely the form of change previously described in connection with FIGS. 6 and 6*a*, and causes, after a determined rise in potential, break-down and conduction through a neon tube Ne2. Conduction through Ne2, increasing to full value within one microsecond, produces a positive-going pulse of extremely steep wave front across resistor R67, and this pulse is translated through capacitor C66′ to the input of a triode V27. That triode is normally biased to cut-off by a voltage derived through a rectifier-resistor net comprising resistors R68, R69 and a rectifier Re9 which is connected at K to one of the low voltage filament power sources of the surface apparatus. The terminal K may be located at transformer T20 in the upper portion of FIG. 2*b*. With V27 normally cut off, arrival of the sharp positive-going pulse created by conduction through R67 causes momentary conduction through V27 and anode load resistor R72 (FIG. 2*b*). This causes a negative-going pulse to appear on lead 160 at the lower end of R72. This − pulse is very sharp and is employed, following, and in conjunction with, the three + pulses previously produced on lead 157, to control a novel ring or relay control circuit employed to cause operation of the four signal channel gating relays.

The aforementioned ring or relay control circuit comprises four triodes V28, V29, V30 and V31 (FIG. 2*b*), all operated on a common cathode bias. The bias and operation of the control circuit is such that only one of the four triodes conducts at any time (except during very rapid shift of conduction status from one triode to the next in the ring); and further is such that the tubes conduct in turn, V28 in response to the aforedescribed negative pulse on lead 157, V29 in response to the first + pulse, V30 in response to the second + pulse and V31 in response to the third + pulse, assuming initial conduction through V28 in response to a − pulse. In effect, the negative pulse may be termed a "reset" pulse for the reason that its arrival causes V28 to seize the conduction status from either of the other three triodes (V29, V30 or V31) that happens to be conducting. Thereafter the first + pulse causes V29 to conduct, etc., in the order named. This will hereinafter be more fully explained in connection with a detailed exposition of the components and operation of the relay control circuit.

As before noted, the reformed sharp negative pulse of each group of four such pulses is applied to lead 160. That lead is connected directly to the anode of V28, to the grid of V29 through an RC net comprising resistor R81 and capacitor C69, to the grid of V30 through R85, and to the grid of V31 through R89. The reformed positive pulses are applied in timed succession to lead 161 from lead 157 through coupling capacitor C68. Lead 161 is connected to the grid of V28 through R73, to the grid of V29 through R78, to the grid of V30 through R83, and directly to the anode of V31. The anode of V28 is connected to B+ voltage supply lead 155 through resistor R72; and the anodes of V29, V30, and V31 are connected to the same B+ lead 155 through, respectively, resistors R77, R87, and R88. The grids of V28, V29, V30, and V31 are connected to ground lead 153 by way of respective grid resistors R76, R79, R84, and R90. The cathodes of the four triodes V28–V31 are collectively connected to ground lead 153 through an adjustable cathode bias resistor R86, and grounded for A.C. potentials by capacitor C72. Lead 160 serves as a control signal lead for V28, and lead 161 similarly serves as a control signal lead for V31. Similar control signal leads 162 and 163 are provided for V29 and V30, respectively. As will presently be made evident, these control signal leads convey respective relay control signals produced by operation of the corresponding triodes, and serve also to convey respective triode-operation controlling voltages as well.

The sequential operation of the ring or control circuit comprising the four triodes is as follows, assuming that either one of the triodes is conducting, and a negative sync pulse is the next pulse to arrive through V27. If V28 is conducting, arrival of the − pulse does not shift conduction status to another of the four triodes, since that negative pulse is not applied to V28 but is applied to the grids of non-conducting tubes V29, V30, and V31 to insure continued non-conduction thereof. However, if initially either V29, V30 or V31 is conducting (in which case V28 must be non-conducting), arrival of the negative pulse on lead 160 causes the following actions: the − pulse is applied to the grid of V29 through paths including R85–R83–lead 161–R78; is applied to the grid of V30 through R85, and is applied to the grid of V31 through R89. Conduction through whichever of V29, V30 or V31 is conducting is thereby decreased to some extent. Concurrently with this decrease in current through the conducting triode, a decreasing voltage drop across the common cathode bias resistor R86 has the effect of decreasing the + bias on the cathodes of all four triodes, and this in turn makes the grid of V28 more positive with respect to the cathode of that tube, thereby permitting conduction through V28 to commence. Conduction through the non-conducting triodes among V29, V30, and V31 will not at this time commence, because of the negative pulse appearing on their grids while that is not the case with V28. As conduction through V28 commences and increases, restoration or normal + cathode bias on all four triodes commences and continues, with concurrent decreasing conduction through the previously conducting triode among V29, V30, and V31. The shift in conduction status from the previously conducting triode to V28 is aided by the increase in current through V28, since that current produces a continuing and increasing voltage drop across R72, which negative-going voltage is concurrently applied from lead 160 to the grids of V29, V30, and V31 to further depress conduction through the conductive one of those triodes. Thus the shift of the conductive status to V28, once initiated by the incoming negative pulse, progresses with increasing rapidity and is quickly accomplished. In fact, the shift is so rapid as to be measured in terms of electron-transit time in the control circuitry.

During the period V28 is not conducting, a charge builds up and is maintained on C69 by current flow from ground through R79 and from B+ lead 155 through R72 and lead 160. A similar charge builds up on C70 by current flow from ground through R84 and from lead 155 through R77 and lead 162. Similarly, a charge builds up on C71 by current flow from ground through R90 and from lead 155 through R87 and lead 163. Thus the triode grids connected to the lower sides of C69, C70, and C71 are held at respective negative bias levels which may be individually lowered by partial discharge of the respective capacitor. When conductive status is seized by V28 incident to arrival of the negative sync pulse, anode current flow through R72 causes a drop in potential on lead 160 which is maintained as long as V28 conducts. This action permits partial discharge of capacitor C69 through resistor R81, without, however, affecting C70 or C71; and this partial discharge of C69 and reduction of negative bias on the grid of V29 sets the stage for, and insures, seizure by V29 of conductive status from V28 upon arrival of the first + syn pulse on lead 161. The aforementioned voltage drop produced on lead 160 incident to conduction through V28 is additionally and primarily employed to control operation of signal gating relay Ry11 (upper right portion of FIG. 2*b*) in the first resistivity signal channel, as will presently be explained.

With V28 in the conductive state, arrival of the first + sync pulse on lead 161 initiates a shift of the conductive status from V28 and V29. The incoming + pulse is applied to the grid of V28 via R73, to the grid of V29 via R78, to the grid of V30 via R83, and to the grid of V31 via paths including the path R73–R75–lead 162–R91; and of course the pulse may arrive at the four grids by other paths which are obvious. Since all of the reformed pulses are of extremely steep wave front, there is substantially no delay nor attenuation in their application to the several triode grid circuits. The noted + pulse has no appreciable direct effect on V28, which is already conducting. Since by previous partial discharge of C69 with concurrent maintenance of charge on C70 and C71 the negative bias on the grid of V29 has been lowered below that on V30 and V31, arrival of the + pulse on the grid of V29 raises the grid potential at that point sufficiently to initiate conduction through V29. Such conduction has two immediate effects both of which tend to reduction and extinction of conduction through V28 and concurrently insure that neither of V30 nor V31 will start conducting. The first of these effects is a lowering of the positive potential level of lead 162 by the voltage drop through anode resistor R77, as conduction through V29 commences, resulting in a decrease in the + potential applied through R75 to the grid of V28 and applied through R82 to V30 and through R91 to V31. The second effect is the increase in + voltage level on the common cathode lead caused by the momentary increase in current through R86, which voltage change makes the several cathodes more + with respect to their respective grids. Both effects tend to inhibit conduction through V30 and V31, and also tend to reduce conduction through V28. Conduction through V29 therefore continues to increase, both of the effects increase in magnitude, and the conductive status is very rapidly shifted from V28 to V29. V29 remains in the conductive state until after the second + sync pulse arrives on lead 161; and in conducting causes a lower + potential level to exist on lead 162 because of the increased voltage drop across R77. This lowered potential on lead 162 permits a partial discharge of C70, thereby dropping the negative bias on the grid of V30 and preparing the latter tube for capture or assumption of the conductive status upon arrival of the second + sync pulse on lead 161. Also the potential drop on lead 162 is employed, in a manner and by means hereinafter discussed, to cause operation of a signal gating relay Ry12 in the second resisitivity signal channel.

The second + sync pulse is applied to the grids of all four triodes, by paths now evident and the same as those followed by the first + sync pulse. With V29 conducting, the decreased potential on lead 162 provides a high level of — bias on the grid of V28, insuring continued non-conduction of that triode; and with C71 fully charged the — bias on the grid of V31 is appreciably higher than that on the grid of V30, capacitor C70 having been partially discharged by the drop on lead 162. Arrival of the second + pulse thus initiates commencement of conduction through V30. The current through V30 in passing through R87 drops the + voltage level on lead 163, thus decreasing the + voltage level on grids of both V28 and V29, and concurrently increasing the + cathode bias on all four triode cathodes. Again, as formerly, the two concurrent effects tend to maintain V28 and V31 in the non-conducting state and tend to increase conduction through V30 and decrease conduction through V29; and thus the conductive status is shifted from V29 to V30. The lowered potential on lead 163 due to V30 plate current flow through R87 permits partial discharge of C71, and thereby prepares V31 for capture of conductive status from V30 upon arrival of the third + sync pulse on lead 161. Also, the lowered potential on lead 163 is employed in effecting signal-gating operation of a relay Ry13 interposed in the third resistivity signal channel. The decreased potential on lead 163, reflected to the grids of V28 and V29, tends to insure continued non-conduction on the part of those triodes.

In a manner now evident, arrival of the third + sync pulse on lead 161 initiates capture of the conductive status by V31 from V30, the ensuing transfer of conduction following the previously enunciated principles. Conduction by V31 lowers the potential on lead 161, and this decrease is employed to control operation of a signal-gating relay Ry14 interposed in the fourth resistivity signal channel. After the apparatus is once set in operation, the sequences or repetitive groups of one negative and three positive sync pulses initiate conduction through V28, V29, V30, and V31 in that order in repetitive cycles, one cycle per commutation cycle in the subsurface apparatus, and in synchronism with concurrent arrival of respective first, second third, and fourth resistivity information signals. As previously indicated, the output pulses (negative-going) of V28–V31 created incident to conduction through respective tubes of those triodes, are employed for relay control in respective resistivity signal channels. These output pulses are of a character indicated by graphs *k, l, m,* and *n* in FIG. 7, and will hereinafter be more fully treated in connection with explanation of the signal gating operations.

A modified form of the just-described control circuit is adapted to utilize a continuing series of pulses of the same polarity to provide output pulses in turn to each of a plurality of lines and perform computer functions rather than synchronization functions. This modification will hereinafter be more fully explained.

Referring specifically to FIG. 2*b*, it is recalled that the incoming resistivity information pulses arriving on cable leads 2″, 3″ were chopped at SvS1, transformed at T12, and reconstituted into D.C. pulses at the output contacts SvS2 of synchronous converter Sv; and that the output complex was filtered to clear the D.C. pulse signals of all A.C. components by the filter comprising choke C*h*7. In the exemplary apparatus the D.C. signal pulses are translated onto lead 33 in sequences or groups of four. The first pulse of any of these groups is that representing the short normal resistivity measurement, the second pulse representing the long normal resistivity measurement, etc., as previously made apparent. While all of the resistivity information signals are impressed in turn upon lead 33, each is translated therefrom into and through a respective separate signal channel for individual gating, amplification, and translation into an increment of a respective resistivity log by a respective recorder means. It will be recalled that in the subsurface apparatus the four resistivity signals, as picked up at the potential electrodes, were of widely different intensities and were accordingly subjected to different degrees of attenuation prior to presentation to the single signal amplifying means in that apparatus. The object was, as noted, to provide input signals of intensities within the dynamic range that the amplified could accommodate. The degree of attenuation of signals in any given channel is predetermined, so that the mathematical relationship of the attenuated signal to the input signal is in each case known. Thus the intensities of the reconstituted D.C. pulse signals translated onto lead 33 bear known mathetmatical relationships to the resistivity measurement values they represent. One purpose of providing individual amplifying means in each signal channel in the surface apparatus is to enable the operator to restore the signal in each channel to its true intensity level, or alternatively to a predetermined level bearing a definite known relationship to the original intensity level, for presentation to a respective signal recorder. Since the four resistivity signal channels fed from lead 33 are similar in physical construction and operation, differing only in electrical values of some components, only the first such channel and its operation will be described in detail. It is to be noted that while all of the information signals in the form of reconstituted D.C. pulses are presented in sequence to all of the individual signal channel input circuits, each individual signal is, by means of a gating relay, admitted to only its respective individual amplifier.

Figure 7:
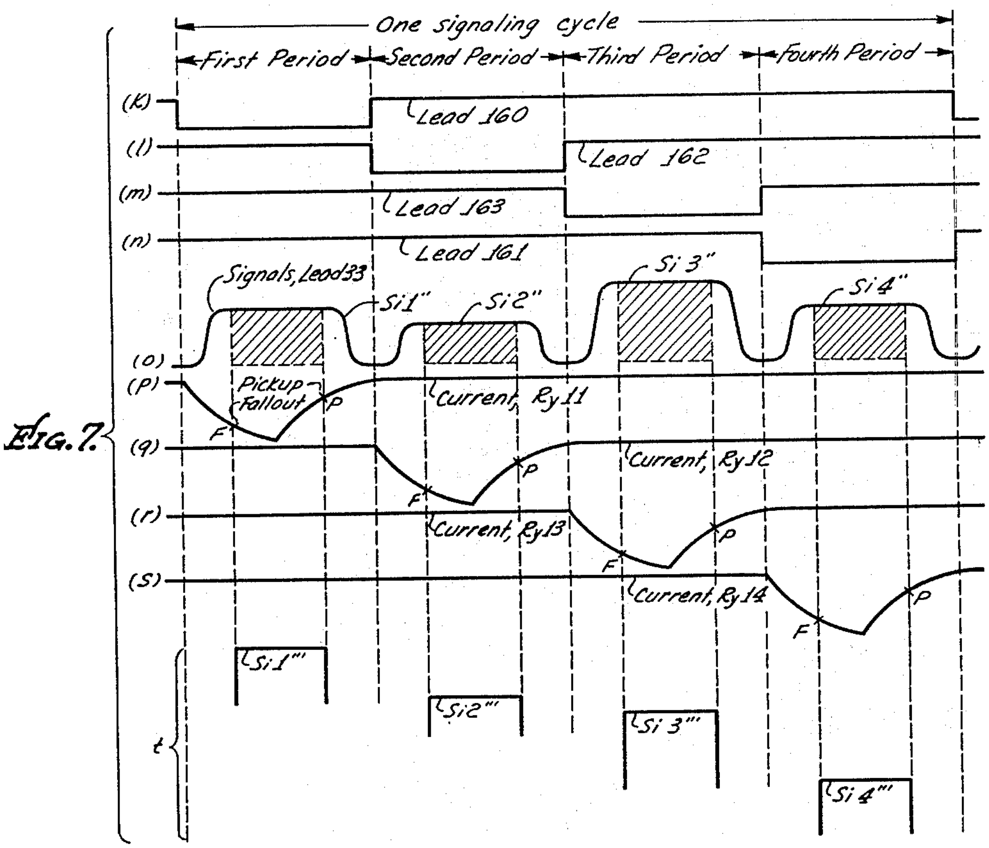
FIG. 7 is a series of related graphical representations of potentials or waves, relating to signal gating operations.

Signal lead 33 is branched as indicated to provide leads from which respective signal pulses of each group are translated into the individual signal amplifier-recorder circuits. The first of these circuits, in the signal channel for the first pulse of each group (see the upper right of FIG. 2*b*), has a branch from lead 33 over which the signal pulse enters through an adjustable resistor R101. This resistance is made adjustable to permit of circuit calibration, as will hereinafter be described. The incoming D.C. pulse signal passes to ground through a sensitivity-adjusting variable resistor R102, from which a signal of selected intensity is derived at slider R102S. The signal thence passes through normally closed contacts Ry20A1 of a relay Ry20, and on to a movable contact Ry11*m* of the aforementioned signal gating relay Ry11. The latter relay is normally energized (by anode current through a normally conducting relay drive tube V101), with movable contact Ry11*m* in the upper, open-circuit position, thus maintaining the first signal channel in a normally open-circuit condition. The gating performed by relay Ry11 is two-fold in purpose. First, the signal translating circuit is closed at only the proper times to pass the first pulse of each group of reconstituted signal pulses. Secondly, the fall out and pull up of the relay are so regulated or controlled that the distorted leading and trailing portions of the signal pulse are eliminated and only the middle part of each first pulse is passed. The gating and other signal translating circuit of the first signal channel operates in the following manner, reference being directed also to the wave forms shown in FIG. 7. Relay drive tube V101 is normally conducting, and the anode current, indicated by curve (*p*) of FIG. 7 energizes the coil of Ry11 to maintain the first channel circuit normally open. Since the negative-going pulses on leads 160, 162, 163, and 161 occur in series with each following another in time, they may be as indicated by curves *k*, *l*, *m*, and *n* of FIG. 7. The first of a series, occupying the first period in a signaling cycle and being that produced on lead 160 as tube V28 conducts, appears across C103 and on the grid of drive tube V101 and causes cut-off in that tube. This may occur substantially instantaneously with arrival of the control pulse on lead 160; however, relay Ry11 does not fall out until a short time afterward, due to the time constant of the coil of the relay and capacitor C101 connected in series with a resistor (not shown) across the relay coil. The current through Ry11 follows curve (*p*), and is seen to commence decaying upon arrival of the control pulse and falls to a minimum near the middle of the first signal period. Then, due to differentiation of the leading edge of the negative-going control pulse by C103–R103 at the input to V101, the tube conducts and the relay current rises to a maximum or normal value by the end of the period. During the decay of relay current a value is reached, as indicated at point F of curve (*p*), at which the relay falls out and the signal-translating contacts close. Similarly during the rise of relay current a point P is reached at which the relay picks up, opening the signal-translating contacts. The circuit constants are so chosen that relay fall-out does not occur until the reconstituted D.C. pulse signal (*Si1″* of curve (*o*) in FIG. 7) has reached a steady-state value; and also so that as the leading edge of the control pulse is differentiated by C103–R103, relay pick-up occurs prior to arrival of the trailing end of the signal pulse *Si1″*. In this way the leading end portion of signal pulse *Si1″* is denied translation through the relay, and the trailing end is likewise excluded; and thus only the middle of the signal pulse, as shown hatched in curve (*o*) of FIG. 7, is translated through the relay. Thus the first-channel signal is such as that indicated at *Si1″* in FIG. 7.

From the preceding it is seen that there is passed through the temporarily and briefly closed lower contacts of Ry11, a re-formed (shortened) D.C. pulse sample *Si1‴* of square wave characteristics, whose amplitude represents the desired information for an increment of the first channel (short normal) resistivity log. This pulse will be separated in time from the next first channel pulse by a considerable period of time during which the second, third and fourth channel signal pulses will be translated into and through respective circuits by operation of respective gating relays Ry12, Ry13, and Ry14. Since the signal *Si1‴* passed through the gating relay is of brief duration as compared with the total period of one 4-channel signaling cycle, means are provided for "extending" or "holding" the effect of the signal so it may register on the recorder means for a period equal to the duration of one complete signaling cycle. These means comprise an R–C network consisting of a capacitor C104 and a resistor R104 connected as indicated in the input circuit of a modified "push-pull" amplifier comprising the two triode amplifier tubes, V102, V103. A common cathode resistor R105 interconnects the amplifier cathodes and ground. By this circuitry, push-pull amplifier operation is obtained without the complexity of ordinary push-pull circuitry, and the dynamic range of the amplifier is doubled. It is to be noted that the amplifier is a D.C. amplifier, only positive-going D.C. pulses being applied to the input. The signal persistence circuit comprising R104 and C104, which desirably must maintain the signal in substantially undiminished intensity during a period intervening termination of the incoming signal sample and the next fall out of Ry11, is composed of elements providing a large time constant; for example, ten seconds when the complete signaling cycle is 1/30 second long. Thus when a D.C. signal pulse sample is passed by relay Ry11, the grid of V102 is brought substantially to the potential level of the signal pulse and is maintained at substantially that level by the R–C pulse persistence network until passage of the next first-channel signal by relay Ry11. The grid and R–C circuit potential level is, of course, reset by each admitted pulse, being raised if the first-channel signal intensity is in the increasing direction and reduced if the signal strength is decreasing.

As a result of the admission of a selected portion or sample of a D.C. pulse signal through relay Ry11, there is thus produced at the output of amplifiers V102–V103 a continuous signal whose intensity is re-set once each signaling cycle (once during each 1/30 second in the example). This continuous signal, developed as the difference in potential drops across anode resistors R105–R106, is utilized by conventional galvanometer-recorder means herein represented by RG1, to produce a continuous graph or log of the discrete information samples secured by the first resistivity information channel in the subsurface apparatus. The graph or log is produced in a known manner to show the resistivity measurement values related to the position or depth in the borehole at which the respective measurement values were obtained.

In previous paragraphs it has been explained how the first output pulse of the sync or control circuit, which pulse appeared on lead 160, caused timed closure and reopening of normally open contacts of relay Ry11 to select and pass a sample portion of the first D.C. signal pulse contemporaneously arriving over lead 33. In a similar manner, the second output pulse of the sync or control circuit (produced by conduction through V29 and appearing on lead 162), causes fall-out and pick-up operation of second channel gating relay Ry12, to in a similar operation pass a middle portion Si2''' of the concurrently arriving second D.C. signal pulse Si2'' into a similar signal-persistence and amplifier circuit which feeds a second galvanometer-recorder unit RG2. The latter in a similar fashion produces the second (long normal) resistivity log. In manner now evident and by similar means depicted, the third (short lateral) resistivity signal Si3' is modified by gating and holding and passed to a respective galvanometer-recorder unit RG3 by operation of gating relay Ry13 in response to a pulse produced on lead 163 incident to conductivity status shift from V29 to V30. Similarly the fourth resistivity signal Si4'' is modified and fed to a galvanometer-recorder unit RG4 by fall-out operation of gating relay Ry14 in response to a pulse created on lead 161 incident to conduction through V31. It will be recalled that the original resistivity signals were picked up with respective intensities which differed considerably, and that the signals were attenuated to different extents to accommodate the signals to the range of a single signal amplifier in the subsurface apparatus. As a consequence, the signals as presented to the galvanometer-recorder units in the surface apparatus are related in intensity to the original signals by predetermined known relationships determined by the respective attenuations, amplifications, and circuit element values. By proper assignment of values to transverse scalar divisions on the recording mediums or papers in the respective galvanometer-recorder means, the effects of the different degrees of signal attenuation in the subsurface signal channels may easily be accounted for, whereby the graphs or logs present accurate portrayals of the original signals picked up at the respective electrode pairs. Accommodation or compensation of the different attenuations applied to the signals in respective channels may also be effected in whole, or in part, by correspondingly different ratios or degrees of amplification, attenuation, etc., in the surface apparatus. For example, each galvanometer-recorder unit may, in accord with conventional practice, be provided with variable attenuating and/or amplifying input circuits.

*Power Supply*

A regulated supply of power and potential for indicated components of the surface apparatus is provided. Power is derived from suitable A.C. mains, such as the 115 v. A.C. mains depicted in the upper portion of FIG. 2*b*, by a transformer T20 which has several secondary windings as indicated. One of the secondary windings is center-tapped and supplies anode potential for a full-wave rectifier tube V105 whose cathodes are heated by power derived as indicated from another secondary winding. Filtered D.C. potential is supplied from V105 to a lead 170, and this potential is employed for anode supply for V26 as indicated, and for a regulated power supply unit depicted within the dash-line rectangle 171 in FIG. 2*b*. This unit includes tubes V106, V107, V108, V109, and V110, and provides a regulation better than 0.1% and a long-term output consistency of 0.1%. The unit as diagrammatically depicted is or may be of conventional design; and may be replaced by any conventional power supply unit of comparable characteristics. The unit provides, through the previously mentioned B+ supply lead 155, constant anode potential to the control-circuit elements, the relay control tubes V101, etc., and to the signal amplifier circuits, all by connections as shown in FIGS. 2*a*–2*b*. Also from lead 155 there is supplied potential for circuit calibrating means for the N.P. and resistivity recorder circuits, as will be in greater detail explained hereinafter in connection with a description of apparatus calibration means and procedure. Transformer T20 is provided with an auxiliary secondary T20S5 which provides, through a normally open calibration switch *Swc*, power to energize the coil of the aforementioned normally relaxed relay Ry4 (FIG. 2*a*), and the coil of relay Ry20 (FIG. 2*b*) which operates contacts Ry20A1, etc. Switch *Swc* is closed only when it is desired to calibrate certain components of the subsurface and surface apparatuses.

*Calibration Means and Procedure*

Referring of FIG. 2*b*, it is seen that closure of switch *Swc* permits current supplied from tranfsormer T20 to flow through a lead 175 and through the coil of relay Ry4 (FIG. 2*a*), whereby the latter pulls up and connects input signal leads 2''–3'' across a selected portion of a variable resistance R120 inserted in B+ lead 155 as indicated. This causes application of a selected D.C. potential (e.g. 1.0 v.) to signal leads 2''–3'' in lieu of the normal D.C. pulse signals, the value of the potential applied being indicated by a voltmeter V which may temporarily be connected across leads 2''–3''. Closure of switch *Swc* also causes relay Ry20 to pull up, hereby contact Ry20A1 is raised to eliminate sensitivity-varying attenuation resistor R102 from the signal input to the first channel amplifier, and leaving only calibration resistor R101 in that circuit. R101 is then so adjusted as to produce, say, full scale deflection of the galvanometer unit in RG1 (the input signal potential on 2''–3'' having been adjusted to a standard, such as, for example, 1.0 v., as stated, and the galvanometer having been standardized at, for example, 25 microamperes for full scale deflection), whereby the first signal channel is calibrated. Variation of resistor R102 is employed to cause recording at a sensitivity value below the value prescribed by a selected one of the resistors in Rc1 (FIG. 3*b*) of the subsurface apparatus. The sensitivity adjustment is not made during the calibration procedure, however. Adjustment, or calibration, of the circuit for second channel signals for recording on RG2 is made in the same general manner as just indicated for the first channel; and similarly for the respective signal channels leading to RG3 and RG4, it being noted that Ry20 operates appropriate contacts in all of the resistivity signal channels.

Pull-up of relay Ry4 (FIG. 2*a*) in response to closure of switch *Swc* (FIG. 2*b*), causes disconnection of the N.P. recorder and associated input circuitry from between lead 1' and surface ground G(*Sur*) at contacts Ry4*a*, and connection of the recorder N.P.G. between lead S' and a point on a variable resistor R121 connected in lead 155. Thus the N.P. recorder input circuit has impressed thereon a D.C. potential derived from a portion of the IR drop across R121. This potential is measured by measuring the current produced thereby through a resistor R122 of known large value, and adjusted by varying R121 to produce a current of a value known to be required for full scale deflection of the recorder galvanometer; for example, 25 ua. In the event the galvanometer does not register exactly full scale deflection, it is brought to that state by varying the slider on a variable resistor R41. Prior to operating the logging tool within a borehole, the proper potential for full scale deflecting may be applied between subsurface apparatus electrode E*b* and the wire connection to the surface ground electrode, with relay Ry4 in unenergized state. In both cases, the movable contact of a potentiometer P*ot* is assumed to have been set at the position corresponding to the desired sensitivity at which the N.P. log is to be made.

Figure 8:
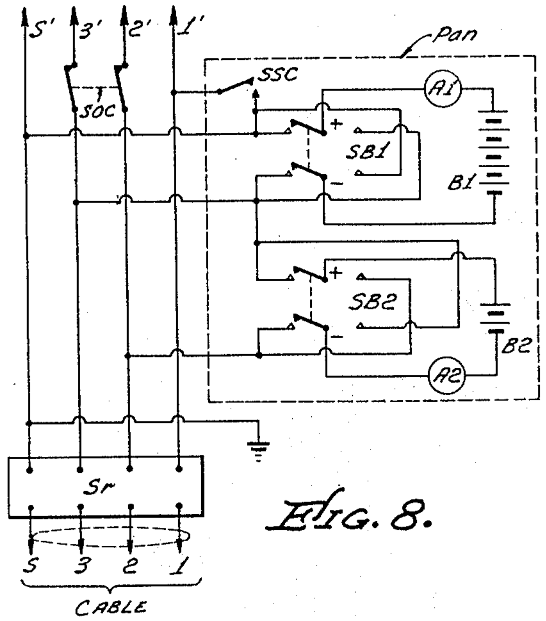
FIG. 8 is a circuit diagram of certain switch and power circuit means employed in performing subsurface switching operations and switch-position indicating operations.

There is provided in a panel unit P*an* (see the lower left of FIG. 2*a*), switching and power means whereby an operator at the surface apparatus may control certain operations of components of the subsurface apparatus and thereby change the sensitivity settings of the four resistivity channels, may switch circuits from an operating condition to an indicating condition and vice versa, and may determine conditions of circuits and positions of switches. Referring to FIG. 8, in which the essential components of unit P*an* are diagrammatically displayed in schematic form in a dash-line enclosure labeled P*an*, it is noted that two sources of direct current, such as batteries B1 and B2, are connected to the center (input) terminals of respective polarity reversing switches SB1 and SB2, and that the output terminals of SB1 are connected to supply battery current of either polarity to sheath conductor S and conductor 3 of the cable (via S′ and 3′) while the output terminals of SB2 are connected to supply current of either polarity to conductors 2 and 3 (via 2′ and 3′). A short-circuiting switch SSC is connected to permit connection of lead 1′ to lead S′, and a switch SOC permits opening and closing signal leads 2′–3′.

When it is desired to change the sensitivity-setting of the resistivity signal channels at R*c*1, R*c*2, R*c*3, and R*c*4 in the logging tool, switch SSC is closed, thereby short-circuiting the constant-current supply system output flowing through S′–1′ and produced at the secondary of T4. Thus the alternating current flow through cable conductors 1 and S is terminated, and relay R*y*3 (FIG. 3*a*) in the subsurface apparatus is de-energized and falls out, connecting cable conductor 2 to a lead 182 and conductor 3 to a lead 183. Switch SOC is opened to break the signal circuit into the signal-utilizing components of the surface apparatus. Switch SB2 of the panel unit is then moved to the right to apply + polarity energy from B2 to conductor 2 and —polarity to conductor 3. Current then flows down conductor 2 into lead 182, through a rectifier R*ec*3 and the next to top deck of rotary switch R*s*1 into a lead 185, through a resistor R*c*5*e* of bank R*c*5, into lead 186 and into lead 183 to return on cable conductor 3. Resistors R*c*5*a*, R*c*5*b*, etc., are of precision type of known values, hence by reading ammeter A1 in the panel unit P*an* the operator may readily determine by current magnitude that the units of rotary switch R*s*1 are in the "X" position as shown in FIG. 3*b*. In a similar fashion the placement of the sets of contacts of R*s*1 in "Y" position can be determined, since the R*s*1 in that position the indicating current flow is through resistor R*c*5*c* rather than through R*c*5*e* as before. And the "Z" position of R*s*1 is detected or indicated by a current of the same direction that flows through resistor R*c*5*a* rather than through R*c*5*e* or R*c*5*c*. Hence with panel switch SB2 thrown to the right, the positional status of R*s*1 is readily determinable. Reverse operation of panel switch SB2 reverses the podarity of voltage applied to conductors 2 and 3, and current then flows in the reverse direction, down conductor 3 into lead 183, through lead 186, resistor R*c*5*a* of bank R*c*5, through the movable contact of the top deck of a multi-deck rotary step-by-step switch R*s*2, rectifier R*ec* 4, and lead 182 to return lead 2. Resistor R*c*5*a* is of value such that the operator by reading ammeter A2 may determine that switch R*s*2 is in the "*a*" position. Similarly, if R*s*2 is in the "*b*" position, the current flow will be from lead 186 through R*c*5*b* and return via R*ec*4; and if R*s*2 is in the "*c*" position the current flow will be through R*c*5*c*, etc. Thus with switch SOC open and switch SB2 to the left, the positional status switch R*s*2 may be readily determined.

Now, with switches SOC and SB2 open, closure of panel switch SB1 to the right will apply + polarity D.C. from battery B1 to lead 3′ and — polarity to lead S′, to cause current to flow down through conductor 3, lower movable contact of de-energized relay R*y*3, lead 183, rectifier R*ec*1, stepping coil R*s*1C of multi-deck rotary switch R*s*1, to ground lead G*r* and return by way of sheath S. This current flow will energize R*s*1C and thereby advance switch R*s*1 one step, from the "X" position to the "Y" position. Opening of panel switch SB1 and subsequent reclosure thereof will again advance switch R*s*1 one step, from "Y" position to "Z" position; and additional re-opening and reclosure of SB1 as above indicated will step R*s*1 to the original, or "X" position. Thus the positional status of R*s*1 may be readily and rapidly changed at the will of the operator.

Further, with switches SOC and SB2 open as indicated in the preceding paragraph, closure of switch SB1 to the left causes current flow in the opposite direction, down through sheath S, ground lead G*r*, through stepping coil R*s*2C of five-deck rotary stepping switch R*s*2, lead 183 and return via conductor 3. This causes advance of R*s*2 from the "*a*" to the "*b*" position; and repetitive opening and closing of SB1 to the left will in evident manner cause stepping of R*s*2 through the "*c*," "*d*," "*e*," and "*f*" positions and back to the "*a*" position. Thus R*s*2 may be set, or re-set, to any of the mentioned positions by appropriate opening of switch SOC and operations of panel switch SB1. As is evident, the operator may, after re-positioning either or both of switches R*s*1 and R*s*2, check the results of the operation by the previously described switch-position indicating procedures.

Switch R*s*2 may be actuated to set or change the setting of the sensitivity at which the resistivity logs are made. For example, the resistors corresponding to the "*a*" position in banks R*c*1, R*c*2, R*c*3, and R*c*4, may be of selected values to provide 10-ohmmeter sensitivity; with the resistors corresponding to the "*b*" positions selected for 20-ohmmeter logs, etc. In the exemplary embodiment of apparatus the six resistors in any of the respective banks provide for logs of 10, 20, 30, 40, 60, and 100 ohmmeter sensitivities, but it is evident that other sensitivity gradations may be accommodated by appropriate selection of resistor values. As before noted, curves of any sensitivity intermediate those values provided for by the resistors of R*c*1, etc., may be run by suitable change of the slider on resistor R101 in the first signal channel, etc. Further, it is evident that by employing more switch stations in each bank or deck of R*s*2, and corresponding additional resistors in the banks, additional sensitivity ranges may readily be accommodated by the system.

Referring again now to the four-triode control circuit comprising V28, V29, V30, and V31, and to the previous description of its operation, it is thought to be evident that the circuit is not limited to four triodes and associated circuits. Additional triodes, each provided with a resistance-capacitance network in its grid circuit connected to be partially discharged by conduction through a preceding triode, and having a respective anode load resistor and output line, could be employed with an input pulse group composed of one — pulse and one + pulse per triode following the first triode. That is, if a series of N triodes were provided, each but the first having the resistance-capacitance net and the series were fed a negative pulse followed by $N-1$ positive pulses, an output pulse could be supplied in each of N output lines for synchronizing controlling actions in N controllable circuits. Each series of input pulses comprising a re-setting pulse (in this case the negative pulse), cyclical synchronizing action would be assured.

Additionally it is thought to be evident that if the first triode of a series of N triodes were provided with an R-C network in its input grid circuit, and each of the remaining triodes were similarly equipped and all were otherwise the same for each triode as in the case of triodes V28–V31, the control circuit would operate as a ring circuit of N links upon being fed a continuing succession or series of only + pulses. For example, if a capacitor of proper value were shunted across resistor R73 in the input to V28, as indicated by C68′ in FIG. 9, it would charge during non-conductance of that triode, would partially discharge due to V31 (or the last triode in the ring) conducting, and would seize conductive status from the latter tube upon receipt of a + pulse, in the manner explained in connection with conductive status seizure by V29, V30, etc. Obviously only + pulses would be necessary for causing successive conduction in the order: V28, V29, V30, V31, V28, V29, V30, etc. And in this modified form of control circuit the number of stages (electron tubes) is not limited to four, but may be a larger number, such as 5, 6, etc., it being evident that each stage should include a respective output load and pulse output line, with the latter connected to the R-C input net of the next succeeding stage, and all of the cathodes biased in common.

In the case of the synchronizing control circuit, use of the circuit with more than four triodes or stages (for example, N triodes or stages) would be evident in the disclosed logging system wherein N channels of information are to be accommodated on a time-sharing basis. Since the disclosed logging system is not in principle restricted to the four resistivity channels shown in the exemplary apparatus but may accommodate a greater number of resistivity logging channels (or other equivalent informations), the application of the synchronizing type of control circuit with more than four stages is considered to be obvious.

Figure 9:
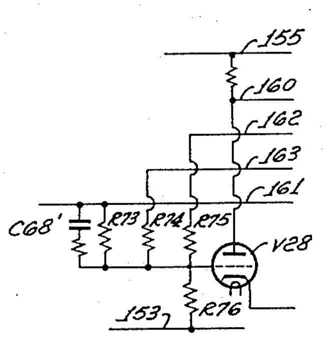
FIG. 9 is a portion of the diagram of FIG. 2*b* with an added element for modifying the circuit operation.

The control circuit as modified in respects indicated in FIG. 9 operates as a ring circuit needing only a succession of + pulses for shifting conductive status from the first to the second, second to third, third to fourth, fourth to first, etc., stages, in repetitive cycles. In this type of circuit the number of stages is not limited to four, but may be extended to N stages by insertion of additional stages between the first and last, in an evident manner. Operated as modified into an automatically repeating ring circuit, the control circuit does not provide a synchronizing effect, there being no re-setting action; hence the circuit finds utility in instances where control, counting, or other function-performing operations not necessarily requiring a re-setting action are to be performed.

In the case of the synchronizing and controllable circuit control means comprising V28, V29, V30, and V31, and in the case of the ring circuit modification as well, it is evident that it may be desirable in instances to provide a resistor in series with C69, and similarly a resistor in series with C70 and a resistor in series with C71. In the exemplary embodiment of apparatus each of these resistors may be of 470K value. Also it is evident that in either of the described types of control or ring circuits it is entirely feasible to insert, between each of the pulse output leads 160, 162, 163, and 161 and B+ lead 155, indicator glow tubes, whereby operations of the control pulse circuitry may be visually monitored. For example, neon tubes, each in series with a 470K resistor, may be connected between respective of the output leads 160, 162, etc., and the B+ lead, to provide for ready monitoring of the control circuit operations. This refinement is not essential, however, to the successful operation of the basic logging system nor to the successful use of the control or ring circuits per se; and to keep the drawings as clear as practicable the indicator tubes and associated resistors are not illustrated.

*Summary*

From the preceding it is seen that by employing a constant current supply system and maintain constant current emanation or flow through the electrodes, only voltage (intensity of field) need be measured for the attainment of extremely accurate logging signals, and necessity for measuring the current in the subsurface apparatus is eliminated. Also it is seen that by successively and repetitively securing succesive bits each of informations, as by sampling the several informations available at a plurality of sets of pick-up electrodes, and converting each bit or sample into a D.C. pulse, the variable transmission characteristics of cable conductors are rendered of no consequence; and since the distorted portions of each D.C. pulse signal are eliminated by gating operations at the surface apparatus, the accepted portion of the D.C. signal pulse accurately represents by its intensity the secured information, herein the fields intensity at the pick-up electrodes. Inter-signal interference is completely obviated by transmitting each signal alone on a clear transmission medium during an allocated period of time, the discrete pulse signals of the several channels being transmitted each in its turn in repetitive cyclical manner. Further, due to the novel high-frequency chopping of the incoming D.C. signal pulses, conversion of the chopped signals into A.C. waves (by transformer T12) and concurrent synchronous rectification of the A.C. waves at the chopping frequency, all extraneous signals are chopped, raised in frequency, and rendered easily removable by filtering. Also the inevitable and variable alternating current leakage from the current conductors to the signal conductors is rendered of no consequence by the novel transformation of the signals to D.C. form for transmission over the cable conductors, since alternating current can readily be removed from D.C. signals. The three conductors and sheath of a structurally advantageous cable are, in the disclosed example of apparatus, economically employed in dual capacities for transmission of power and electrode current to the subsurface apparatus and return transmission of circuit control signals and information signals for an N.P. log and four other logs; while at the same time permitting rapid and efficient indication, calibration, and switching operations in the subsurface apparatus while the latter is at any point in a logging traverse. The novel pulse transformation means comprising neon tubes Ne1 and Ne2 provides a mode and apparatus for producing the extremely sharp-fronted pulses desirable for the described cyclical relay controlling action of the four-triode ring or control circuit comprising tubes V28–V31. The novel means of controlling the output of the A.C. generator from a sample IR drop produced by the output provides substantially instantaneous correction of any tendency of the electrode current (or output voltage, if so desired) to vary in intensity; and by changing the sample from A.C. to a D.C. control voltage by the voltage doubler-rectifier network comprising D3 and D4, the effect of varying phase shift of the current with respect to the voltage in the cable conductors is completely eliminated, so that only the intensity of the cable-conductor current is effective in controlling the amount of energy-transfer from T1 to T2 to cause A.C. generator output voltage to vary so as to maintain constant intensity of the cable-conductor current. Additionally the exemplary system is such as to require only two small electron tube envelopes in the logging tool, thus minimizing troubles from that type of components. And it is to be noted that by substitution of transistor and junction diode circuitry the electron tube components in the logging tool may be further reduced. Thus it may be determined that the objects of the invention have been fully attained.

The exemplary apparatus depicted in the drawings in diagrammatic form may be widely varied in many respects within the scope of the invention, hence is not to be considered to limit the invention except as the latter is restricted by the appended claims. Exemplary electrical values and characteristics of the more important apparatus components are set out in the following tabulation, it being evident that it is intended in the construction and assembly of the apparatus in physical form that good mechanical, electrical and electronic design principles be followed. While the exemplary apparatus was described in connection with operations for producing both normal and lateral resistively logs, it is evident that by mere mechanical change of placement of current and pick-up electrodes, all the logs may be of one type, or of other types, both mixed and of single type. Further, it is evident that with suitable modification of the information-obtaining apparatuses, A.C. signals representing additional or other types of information can be fed through additional isolation transformer means such as those of the T21–T24 group and added corresponding contacts be provided on *Cc*, *Ss*, and switch 36 units, whereby other channels of information may be accommodated in the described system; it being evident that for each additional time-sharing information channel that is added, appropriate additions to the circuitry and apparatus depicted in FIGS. 2*a* and 2*b* must be made.

In the foregoing description the commonly accepted abbreviations for alternating current (A.C.) direct current (D.C.), negative (−), positive (+), and others are employed in their usual senses in the interest of brevity. Also, in some instances circuit elements, listed in the tabulation of parts are not specifically indicated in the drawings, as, for example, the resistors in series with respective gating relay circuit capacitors C101, etc., it being understood that such elements may or may not be used, according to design requirements and other criteria. Further, certain of the components depicted in the circuit diagrams are not further specifically described since with the preceding descriptive information one skilled in the art may readily produce both the exemplary apparatus and a wide variety of others within the scope of the invention as defined in the appended claims.

I claim:

1. A circuit for generating a plurality of electrical pulses having steep wave fronts and fast rise times in response to input wave forms having positive and negative polarity and having a wide range of shapes and amplitudes comprising, in combination, first and second variable resistive means, means for normally maintaining said first variable resistive means at a relatively high effective resistance and said second variable resistive means at a relatively low effective resistance, said first means responsive to the positive polarity of said input wave form to reduce its normally high resistance and said second means responsive to the negative polarity of said input wave form to increase its normally low resistance, and a pair of substantially instantaneous switching circuits respectively actuated by changes in said first and second variable resistive means to generate pulses having steep wave fronts and fast rise times independent of the shape of said input wave form.

2. A circuit for generating substitute pulses having steep wave fronts and fast rise times from wave forms having positive and negative components and a wide range of shapes and amplitudes comprising, in combination, a first variable resistance element, means for normally biasing said first element to a relative high effective resistance, a second non-linear resistance element, means for normally biasing said second element to a relatively low effective resistance, means responsive to said positive component of said wave forms to reduce the normally high resistance of said first element and to the negative component of said wave forms to increase the normally low resistance of said second element, and a pair of circuits including substantially instantaneous switches respectively actuated by changes in the effective resistances of said first and second elements to generate pulses having steep-wave fronts and fast rise times independent of the shape of said input wave forms.

3. A circuit for generating substitute pulses having steep wave fronts and rise times in the order of one microsecond from wave forms having positive and negative components and a wide range of shapes and amplitudes comprising, in combination, a first variable resistance element, means for normally biasing said first element near cutoff, a second non-linear resistance element, means for normally biasing said second element to zero bias, means responsive to said positive component of said wave form to cause said first element to conduct and to the negative component of said wave form to cut off said second element, and a pair of circuits including gas discharge devices respectively actuated by changes in the conductive status of said first and second elements to generate pulses having steep-wave fronts and fast rise times independent of the shape of said input wave form.

4. A circuit for generating substitute pulses in accordance with claim 3 wherein said substitute pulses are differentiated and thereafter inverted to re-establish the polarity of the original wave forms.

References Cited in the file of this patent

UNITED STATES PATENTS

| | | |
|---|---|---|
| 2,250,202 | Matusita | July 22, 1941 |
| 2,448,718 | Koulicovitch | Sept. 7, 1948 |
| 2,570,442 | Grosdoff | Oct. 9, 1951 |
| 2,586,151 | Costello | Feb. 19, 1952 |
| 2,645,714 | Newman et al. | July 14, 1953 |
| 2,651,718 | Levy | Sept. 8, 1953 |
| 2,676,249 | Crosman | Apr. 20, 1954 |
| 2,684,440 | Wallace et al. | July 20, 1954 |
| 2,765,405 | Gararekian | Oct. 2, 1956 |
| 2,878,326 | Cope | Mar. 17, 1959 |